United States Patent
Ramachandran et al.

(10) Patent No.: US 11,831,356 B1
(45) Date of Patent: Nov. 28, 2023

(54) CALIBRATION AND MEASUREMENT OF TRANSMIT PHASED ARRAY ANTENNAS WITH DIGITAL BEAMFORMING

(71) Applicant: Amazon Technologies, Inc., Seattle, WA (US)

(72) Inventors: Iyappan Ramachandran, Sammamish, WA (US); Farideddin Fayazbakhsh, Chatham, NJ (US); Yu Ho, Redmond, WA (US); Tara Yousefi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 17/481,086

(22) Filed: Sep. 21, 2021

(51) Int. Cl.
*H04B 17/12* (2015.01)
*H04B 7/12* (2006.01)

(52) U.S. Cl.
CPC ........................ *H04B 7/12* (2013.01)

(58) Field of Classification Search
CPC .................................................. H04B 17/12
USPC ....................................... 455/226.1; 375/224
See application file for complete search history.

(56) References Cited

U.S. PATENT DOCUMENTS

| | | | |
|---|---|---|---|
| 8,737,929 B2* | 5/2014 | Cohen | H04B 17/12 455/67.11 |
| 10,749,254 B2* | 8/2020 | Arnett | H04B 17/14 |
| 2021/0013975 A1* | 1/2021 | Jacquet | H04B 17/11 |
| 2023/0188225 A1* | 6/2023 | Zhang | H04B 17/12 370/329 |

* cited by examiner

*Primary Examiner* — Don N Vo
(74) *Attorney, Agent, or Firm* — Lowenstein Sandler LLP

(57) ABSTRACT

Technologies directed to calibration and measurement of transmit phased array antennas with digital beamforming are described. One method includes a communication device generating a radio frequency (RF) signal and a reference RF signal generated using a first offset value. A processing device sending to a measurement device data indicating a first periodicity of the first RF signal and a first data acquisition parameter. The processing device receives measurement data indicating conditions of the first RF signal and the reference RF signal received at the measurement device. The processing device determines signal characteristics of the first RF signal and the reference RF signal. The processing device sends a command to the communication device. The command indicates a modification of the first offset value to a second offset value. The communication device generates a second RF signal using the second offset value.

20 Claims, 14 Drawing Sheets

CALIBRATION AND MEASUREMENT OF TRANSMIT PHASED ARRAY ANTENNAS WITH DIGITAL BEAMFORMING

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
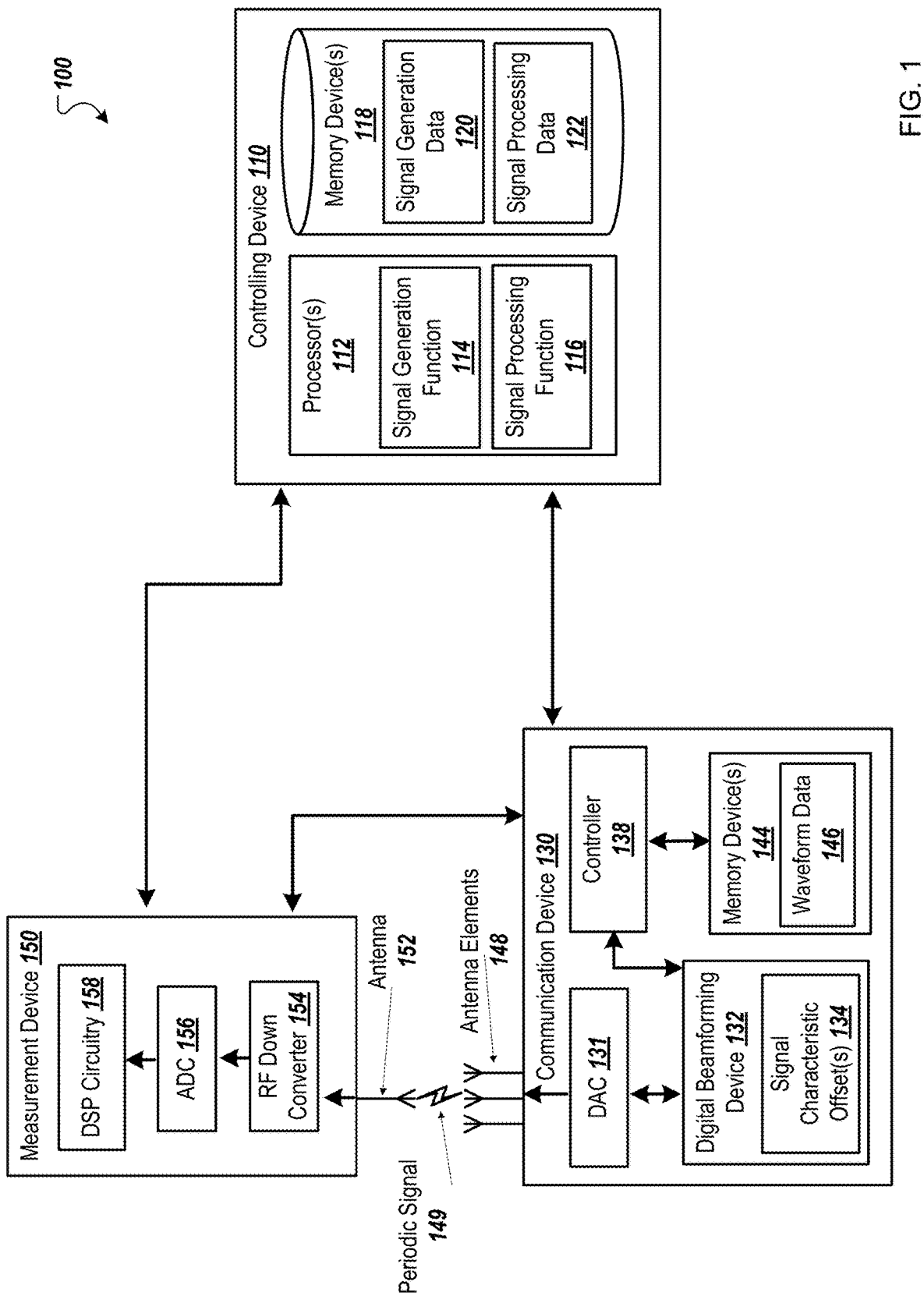
FIG. 1 is a block diagram of a communication system including a controlling device, a measurement device, and a communication device with a digital beamforming (DBF) device and an phased array antenna (e.g., antenna elements), according to embodiments of the present disclosure.

Technologies directed to calibration and measurement of transmit phased array antennas with digital beamforming are described. In an electronically steered phased array, predictable beam patterns are formed by individually controlling the relative phase shift of the signal between each antenna element. Phased array antennas (PAA) coherently weight signals from multiple antennas to create a beam in a desired direction. One way to perform the weighting is by using analog phase. Another is to convert the analog signal to digital and apply digital phase shifting. This latter approach called digital beamforming (DBF), may include the use of one full-fledged radio per element, comprising of mixers, filters, amplifiers, and data converters. Some advantages of DBF include the ability to perform frequency-selective beamforming, and the ability to create multiple beams per frequency.

Proper operation of PAAs may be maintained through antenna element calibration. For example, calibration may be employed to equalize the inherent phase offsets between the antenna elements. Once calibrated, the quality of the formed beam can be validated by measuring the PAA in anechoic chambers. Both these processes may necessitate access to signals going into and coming out of the PAAs. These processes may also demand precise measurement of signal magnitude and phase at multiple locations and/or time instants.

Conventionally, calibration and measurement of PAAs with analog beamforming uses a vector network analyzer (VNA) that puts out a known signal from one port and compares it with the signal received on another port. In the case of a transmission (TX) PAA, the signal from the VNA may be injected into the PAA and the signal transmitted by the PAA may be received by an external antenna and fed back into the VNA. Since the VNA is in control of the transmitted signal and its comparison with the received signal, precise phase measurement is possible.

Conventional methods may fall short in the calibration and measurement of PAAs with DBF. In TX PAAs, access to the digital signal may be limited to a digital baseband quadrature (IQ) input. If a VNA is used, the transmitted signal may require radio frequency (RF) mixed to baseband and converted to digital using an analog to digital converter (ADC) and fed into the PAA. Due to the digital nature of the signals, the various chips involved, and/or communication protocols between them, deterministic latency cannot be guaranteed, which in turn may preclude precise phase measurement.

Aspects of the present disclosure overcome the deficiencies of conventional calibration of PAAs using DBF. The present disclosure includes an alternative method to calibrate and measure PAAs employing DBF that obviates the need for VNAs, additional components, and/or deterministic latency, among other things.

In an exemplary embodiment, a communication device (e.g., a PAA) may generate a periodic signal (e.g., internally using a locally stored waveform pattern) and transmit the signal according to a first periodicity (e.g., play it out in a continuous loop without breaks). Transmission from individual antenna elements can be controlled by appropriately masking the digital to analog converters (DACs). An external antenna may receive the signal transmitted by the PAA and feed it to a vector signal analyzer (VSA), which shares its reference clock with the PAA. Time-synchronous and phase-coherent acquisition may be maintained across every location and/or measurement instant. This may be accomplished by providing the VSA with a periodic trigger whose period is an integer multiple of the first periodicity (e.g., period of the waveform that the PAA puts out). The VSA may initiate data acquisition according to a received data acquisition parameter (e.g., initiate data acquisition on the rising edge of a periodic trigger associated with the periodicity), the phase of each acquisition may be coherent.

In further exemplary embodiments, an external trigger may introduce uncertainty. (e.g., due to the finite slew rate of the trigger signal). For example, the trigger may activate proximate an ADC clock edge of the VSA and effectuate a metastable condition. IN some embodiments, the VSA's internal time trigger capability may be leveraged to overcome the potential uncertainty resulting from the use of an external trigger. For example, a VSA may count the ADC sampling clock and trigger every N cycles of the clock.

FIG. 1 is a block diagram of a communication system 100 including a controlling device 110, a measurement device 150, and a communication device 130 with a digital beamforming (DBF) device 132 and an phased array antenna (e.g., antenna elements 148), according to embodiments of the present disclosure.

The controlling device 110 includes one or more processor(s) 112, such as one or more CPUs, microcontrollers, field programmable gate arrays, or other types of processors. The controlling device 110 further includes one or more memory device(s) 118, which may correspond to any combination of volatile and/or non-volatile storage mechanisms. The memory device(s) 118 stores data associated with processing and carrying out a calibration function (e.g., process 300 of FIG. 3) to be performed in association with communication device 130 and measurement device 150. For example, processor(s) 112 may perform signal generation function 114 and/or signal processing function 116 using signal generation data 120 and/or signal processing data 122. Controlling device 110 may be coupled (e.g., wired and/or wireless connection) to communication device 130. For example, controlling device 110 sends calibration process instructions (e.g., based on signal generation data 120 and/or signal processing data 122) to communication device 130.

As shown in FIG. 1, communication device 130 includes a controller 138, a memory device 144, a digital beamforming device 132, and antenna elements 148. Communication device 130 may include one or more elements and/or features described in association with communication device 200 of FIG. 2. Controller 138 may include one or more processor(s), such as one or more CPUs, microcontrollers, field programmable gate arrays, or other types of processors. Controller 138 may be coupled to (e.g., read/write data) one or more memory device(s) 144, which may correspond to any combination of volatile and/or non-volatile storage mechanisms. Memory device 144 may include waveform data 146 indicating one or more signal patterns (e.g., waveform pattern) associated with antenna elements 148. For example, the waveform data 146 may include one or more frequencies associated with a multi-tone signal (e.g., a broadband signal). Controller 138 may receive data indicating a calibration procedure. For example, controller 138 may receive instructions to generate a signal associated with one or more identified antenna elements 148. In another example, received instruction may include one or more updates to one or more signal characteristic offset(s) 134 (e.g., phase offset values, amplitude shifter offset values, time delay offset values) associated with one or more antenna elements 148.

Controller 138 may generate beamforming instructions for the DBF device 132 based on data received from the controlling device. In some embodiments, the beamforming instructions may be based on waveform data 146 stored on memory device(s) 144. For example, waveform data may indicate a signal pattern used to generate a periodic signal with the one or more antenna elements and may be specific to an antenna configuration associated with the antenna elements 148. The DBF device 132 may receive beamforming instructions from the controller 138 and generate a digital signal (e.g., a digital baseband IQ signal). The DBF device may apply one or more signal characteristic offset(s) 134 (e.g., using a phase shifter, a signal amplifier, amplitude taper (AM taper), etc.) to generate an updated digital signal (e.g., a phase shift offset value, an amplitude offset values, a time delay offset value). The updated digital signal may be converted to a periodic signal (e.g., an analog signal, radio frequency (RF) signal, etc.) using a digital to analog converter (DAC) 131. The periodic signal 149 may sent to measurement device 150 using antenna elements 148 and received by antenna 152.

The signal characteristic offset(s) 134 may include applying an offset to one or more parameters of the digital signal. In some embodiments, the signal characteristic offset(s) 134 includes a phase offset and/or an amplitude offset associated with one or more antenna elements. The signal characteristic offset(s) 134 may be mapped to individual collections of antenna elements 148. For example, the signal characteristic offset(s) may be applied to individual signals generated by corresponding collections of antenna elements 148 resulting in an aggregated phase coherent signal with little to no (e.g., below a threshold level) relative amplitude difference across the individual signals. In some embodiments, the signal characteristic offset(s) 134 are stored as individual register values within the digital beamforming device 132. In another embodiment, the one or more memory device(s) 144 store one or more of the signal characteristic offset(s).

In some embodiments, the memory device(s) 144 may store a mapping of individual signal characteristic offset(s) to one or more signal frequencies. For example, a signal characteristic offset may be associated with a frequency tone of a multi-tone signal or an individual frequency of a broadband signal. In some embodiments, the memory device(s) 144 may store a mapping of individual signal characteristic offset(s) to one or more signal propagation directions. For example, an aggregated signal generated by antenna elements 148 may be steered using coordinated phase shifts across the individual antenna elements 148.

Communication device 130 may be communicatively coupled to measurement device 150 along a second communication channel (e.g., a wired connection or wireless connection) different from the communication channel used to send the periodic signal 149 to the measurement device 150. For example, communication device 130 may be coupled to measurement device 150 through a wired and/or wireless connection separate from antenna elements 148. Communication device may transmit signal data along the second communication channel to the measurement device. The signal data may indicate one or more parameters associated with a periodic signal 149 sent using antenna elements 148. For example, communication device 130 may transmit timing data such as information indicating a periodicity of the periodic signal 149 (e.g., a reference clock, sampling rate, digital to analog (DAC) conversion parameters, timing data associated with the waveform data 146, and the like).

As shown in FIG. 1, measurement device 150 may include antenna 152, an RF down converter 154, an ADC 156, and digital processing circuitry. Measurement device 150 may include one or more features and/or functions of a spectrum analyzer and/or a vector signal analyzer (VSA). Measurement device 150 receives a periodic RF signal 149 through antenna 152. The RF down converter 154 receives an input RF signal and converts the signal in preparation for sampling. An analog to digital converter (ADC) (e.g., an IQ ADC) is coupled to the RF down converter 154 to sample and convert the down converted signal (e.g., baseband signal) to a digital signal (e.g., digital baseband signal). For example, FIG. 4 illustrates many of the signals received and/or processed by the measurement device 150. The RF down converter 154 and ADC clock signal 404 can be components of the digital processing circuitry 158 such as a discrete component, a discrete circuit, logic circuitry, a digital functional block, a programmable block, such as a digital signal processing (DSP) functional block, or the like. DSP circuitry 158 processing the digital signal (e.g., digital baseband signal) from the ADC 156 and extracts signal characteristic data such as phase and amplitude data indicating a phase and/or amplitude of the periodic signal 149 received by the measurement at an instance of time associated with timing data (e.g., periodicity) received from communication device 130 and data processing parameters (e.g., a data trigger) received from controlling device 110.

In some embodiments, the signal characteristic data is sent to the controlling device for processing. The controlling device may perform one or more functions (e.g., signal processing function on the received signal characteristic data. The controlling device may determine one or more updates to the signal characteristic offset(s) 134 based on the received signal characteristic data and sends further calibration instructions indicating the update to one or more of the signal characteristic offset(s) 134. In some embodiments, the controlling device may be coupled to one or more offline processing device that may process the signal characteristic data and return processed data to the controlling device.

In some embodiments, the signal characteristic data is received as character encoded I/Q data. For example, the signal characteristic data may be received as American Standard Code for Information Interchange (ASCII). The controlling device may decode (or facilitate decoding through offline processes) the character encoded I/Q data to generate decoded phase and amplitude data associated with the periodic signal 149. The controlling device may determine an update to the signal characteristic offset(s) based on the decoded phase and/or amplitude data.

Figure 2A:
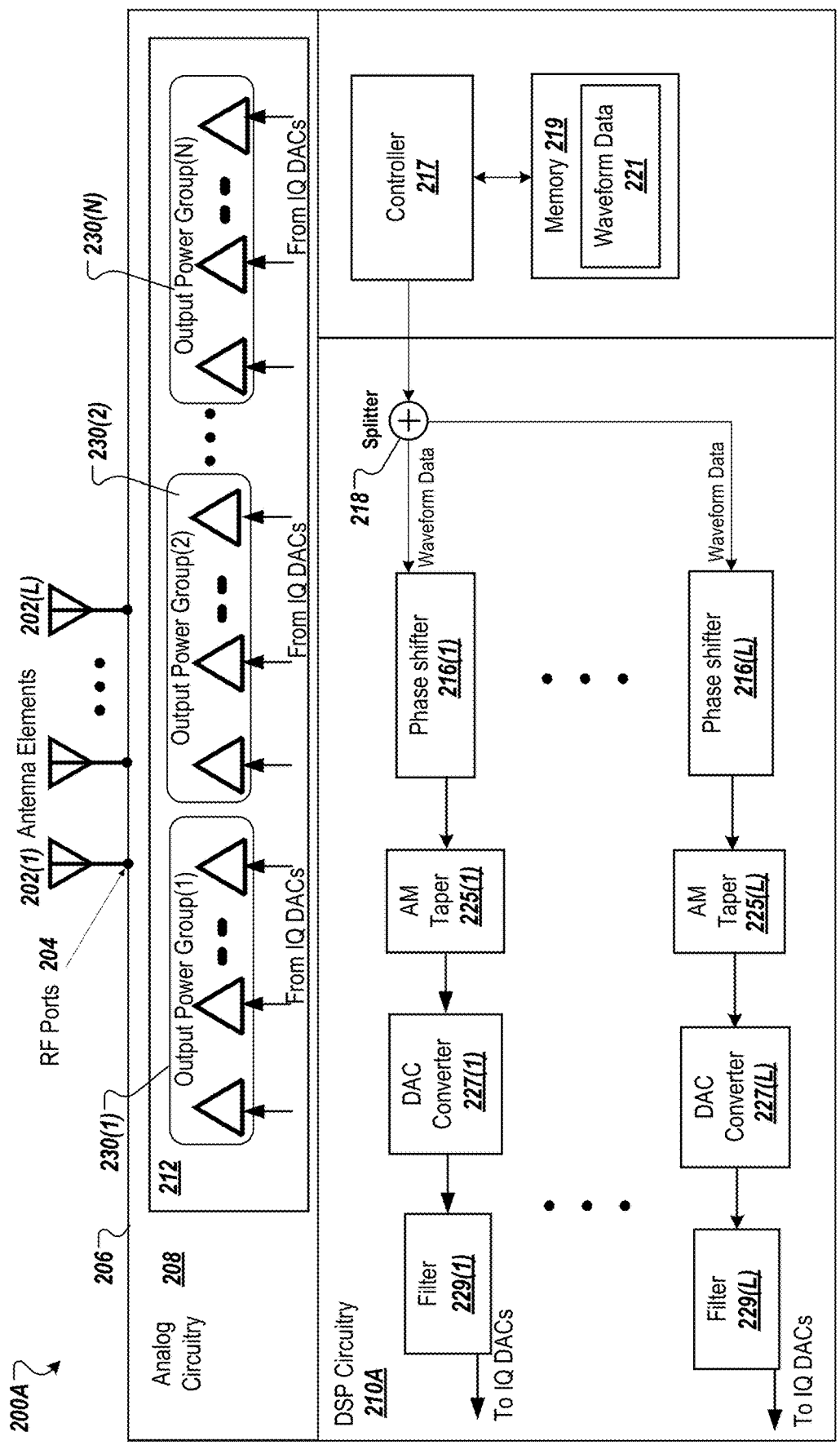
FIG. 2A-B are functional diagrams of communication devices with digital signal processing (DSP) circuitry for a transmit phased array antenna, according to embodiments of the present disclosure.
Figure 2B:
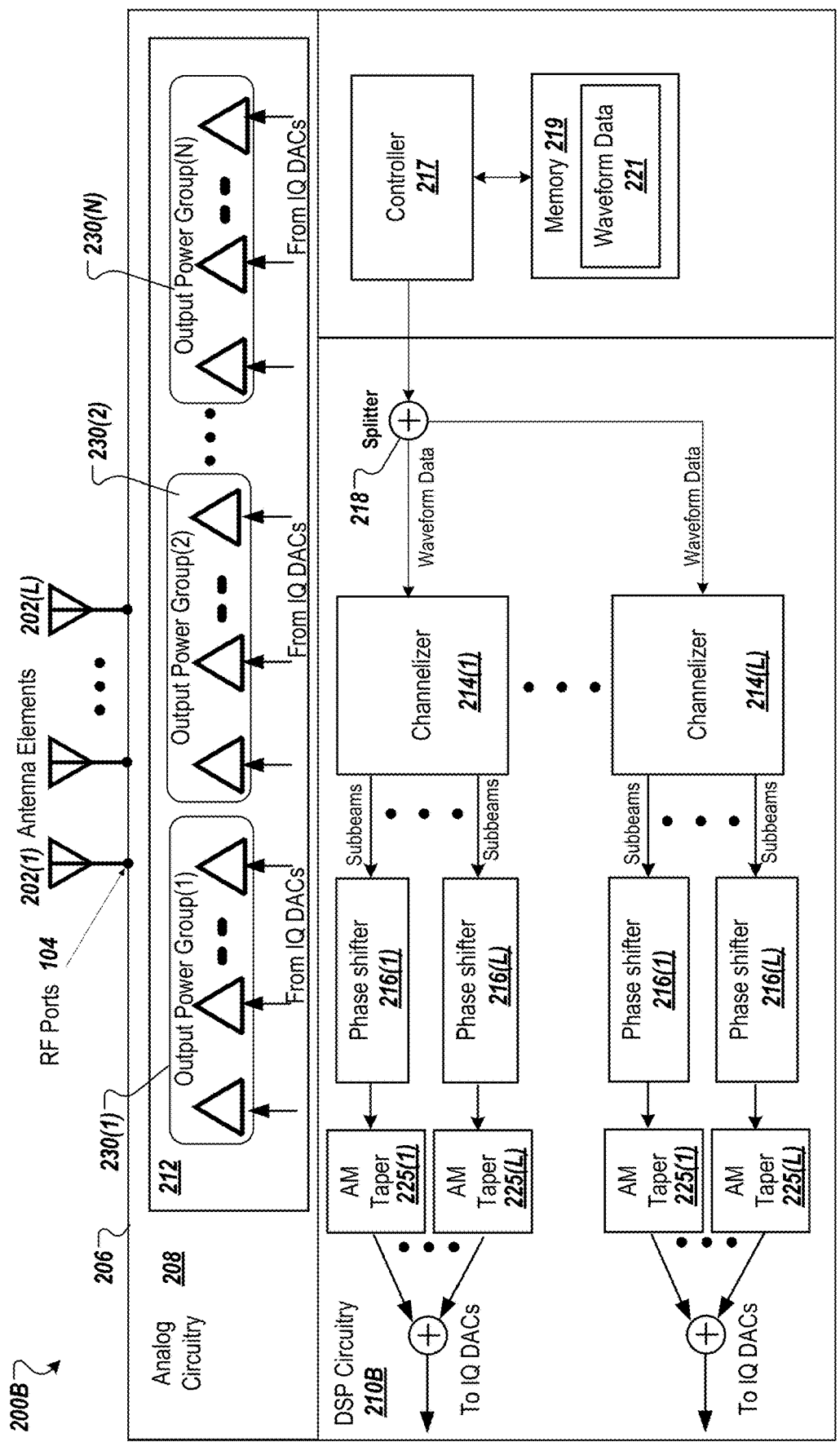

FIG. 2A-B are functional diagrams of communication devices 200A-B with digital signal processing (DSP) circuitry 210A-B for a transmit phased array antenna, according to embodiments of the present disclosure. Communication devices 200A-B includes a transmit phased array antenna including multiple antenna elements 202 and a digital beamforming (DBF) device 206, which includes analog circuitry 208 and DSP circuitry 210A-B. Analog circuitry 208 can also be referred to as radio frequency front-end (RFFE) circuitry. Antenna elements 202 may be disposed in an organized formation (e.g. such as formed in a circular pattern, a rectangular pattern, a hexagonal pattern, or the like) on a circuit board or other support structure. Antenna elements 202 are coupled to the DBF device 206, such as to RF ports 204 of the DBF device 206. Each antenna element 202 can be communicatively coupled to individual phase shifters 216 of the DBF device 106 through RF ports 204 and transceiver (transmitter (TX)/receiver (RX)) chains 212. For example, each antenna element 202 is coupled to one of the transceiver chains 212. A TX/RX chain 212 can include up-converters, down-converters, mixers, amplifiers, filters, analog-to-digital converters (ADCs), digital-to-analog converters (DACs), or the like.

As illustrated in FIG. 2A-B, TX/RX chains 212 include N number of multiple output power groups 230(1)-230(N), where N is a positive integer that is two or greater. Each of the multiple output power groups 230(1)-130(N) includes multiple power amplifiers. Each power amplifier can be coupled to one or more antenna elements 202(1)-202(L). In some cases, power amplifiers are coupled to the antenna elements 202 in a one-to-one fashion. It should be noted that FIG. 2 is a simplified illustration and the phase shifters 216 may not be directly coupled to the RF ports 204. For example, the DSP circuitry 210A-B can include one or more data paths, one or more data buffers, or the like to store digital data generated by digital-to-analog converters (DACs) in analog circuitry 208. For example, DSP circuitry 210A-B can include one or more DACs that receive digital signals from the phase shifters and convert the digital signals into analog voltage signals that are amplified by the power amplifiers of the multiple output power groups 230(1)-230(N). As described herein, the multiple output power groups 230(1)-230(N) can provide different output power levels.

DSP circuitry 210A-B can include one or more DSP blocks, the DSP blocks may include multiple phase shifters 216(1)-216(L), a splitter 218, and an amplitude taper block 225(1)-225(L). The DSP blocks can include other processing blocks. The DSP blocks can be scaled for the number of antenna elements. The DSP blocks of DSP circuitry 210A-B can each be implemented as a processing element of the DBF device 206, such as a discrete component, a discrete circuit, logic circuitry, a digital functional block, a programmable block, such as a DSP functional block, or the like. A simplified portion of DSP circuitry 210 is illustrated in FIG. 2A-B. These DSP blocks can be implemented in a digital domain of the DBF device 206. DBF device can include processing logic for amplitude tapering electromagnetic energy radiated by the array antenna.

In some embodiments, controller 217 receives input data (e.g., calibration instructions 172 of FIG. 1). Controller 217 processes the input data and generates instructions associated with a periodic signal corresponding to one or more individual antenna elements 202(1)-202(L). For example, controller 217 may generate waveform instruction using waveform data 221 stored in memory 219 based on the input data. The controller 217 may provide the waveform instruction data to splitter 218 and the splitter 218.

In some embodiments, such as shown in FIG. 2A, the splitter 218 provides waveform data into each of the phase shifters 216. A phase shifter 216 applies a phase shift to the signal to be transmitted. For example, phase shifters 216 may apply a relative phase shift to each portion of the signal such that each signal of the total outgoing signal corresponds to a direction of transmission. The relative phase shift may be associated with the variable path length of the signal across each of the antenna elements 202. The relative phase shift for an individual phase shifter 216 may be associated with the spatial location of an associated antenna element 202 of the array antenna.

In some embodiments, a phase shifter 216 is associated with multiple antenna elements 202. For example, a DBF device 206 may include one phase shifter 216 that is coupled to transmit signals for multiple antenna elements 202 of the DBF device 206. As noted above, the phase shifter 216 is not necessarily coupled to an antenna element 202. For example, there can be an up-conversion chain, including a digital-to-analog converters 227 signal filters 229 (e.g., a power amplifier), before a signal gets to the antenna element 202. Each phase shifter 216 may shift the phase of signals transmitted by multiple antenna elements 202. In another example, a DBF device 206 may include a phase shifter 216 for each antenna element such that each phase shifter 216 is associated only with an individual antenna element 202 of the array antenna.

In some embodiments, such as shown in FIG. 2B, the DSP circuitry 210B includes one or more channelizers 214(1)-214(L). Each multi-point channelizer may process digital data corresponding to one of the antenna elements 202 according to a number of channels and/or subbeams. Each of the signals for a channel can be aggregated by the channelizer 214 before being converted to analog signals to be transmitted by analog circuitry 208 and antenna elements 202. The phase compensated signal may be sent to antenna elements 202 through RF ports 204 by analog circuitry 208. The antenna elements 202 may transmit the signal at a transmission angle. The transmission angle may be associated with the relative phase shifting of phase shifters 216 (1)-216(L). The various subbeams generated by the channelizers 214 may be associated with individual frequency tones of the signal, as will be discussed further in other embodiments.

In some embodiments, digital data includes an in-phase component and a quadrature component. In these embodiments, phase shifters 216 can phase shift both the in-phase component and the quadrature component. The splitter 218 can include two separate splitters to split the respective in-phase components for each of the other phase shifters. It should be noted that although various figures and embodiments describe a transmitter, in other embodiments, the communication system 200 may operate as a transceiver or a receiver with all the elements effectively operating in reverse. In the receiver embodiment, the splitter 218 may act as a combiner that receives signals from each of the phase shifters that adjust the relative phase shift between subbeams.

In some embodiments, an amplitude (AM) taper 225 can be coupled to phase shifter 216 and can apply an amplitude shaping function to the signal in each channel. In some embodiments, the AM taper 225 applies a weighting function to adjust the amplitude of the signal of each channel. For example, the AM taper may apply an amplitude shaping function to reduce the side lobe levels of the signal of each channel and increase the main lobe beamwidth of the signal of each channel. In another example, the AM taper 225 may provide an amplitude shaping function to improve the directivity of the signal from the array antenna. AM taper 225 can implement an algorithm to determine the exact amplitude distribution of each antenna element 202 in the array.

Figure 3:
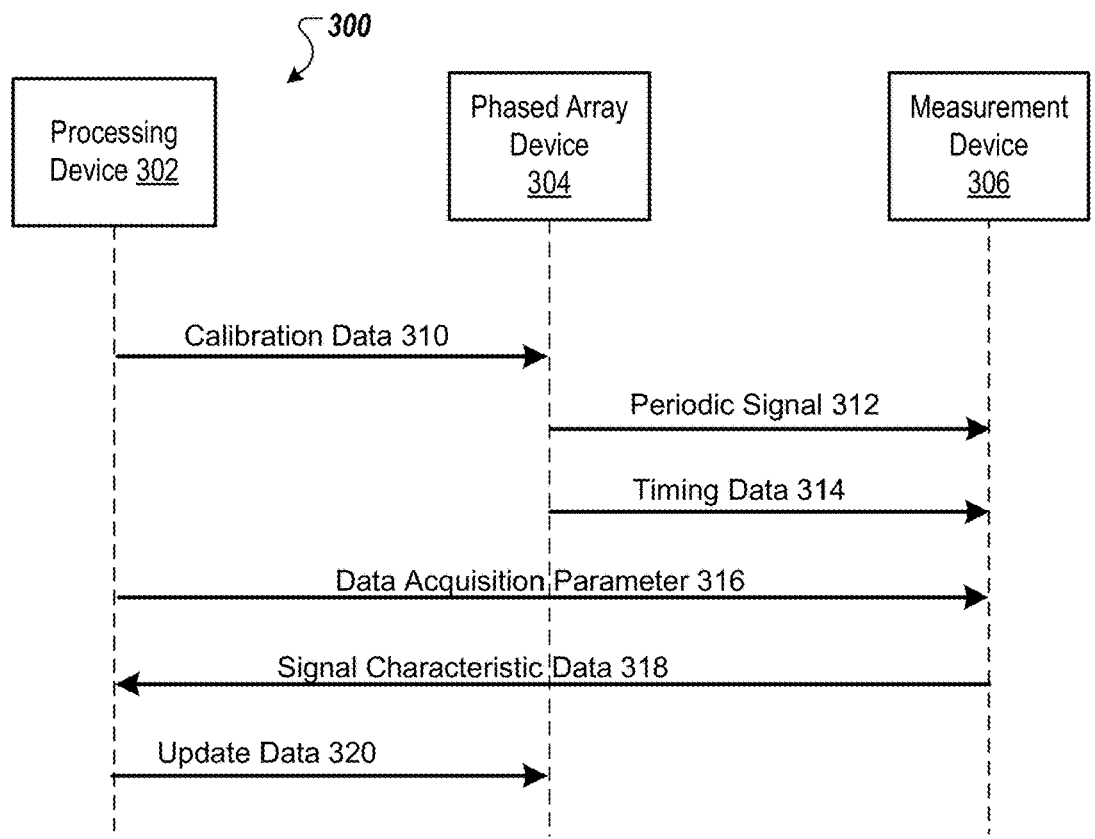
FIG. 3 depicts a digital beamforming calibration process corresponding to an array antenna, according to embodiments of the present disclosure.

FIG. 3 depicts a digital beamforming calibration process 300 corresponding to an array antenna, according to embodiments of the present disclosure. The calibration process 300 may be performed by a processing device 302 (e.g., controlling device 110 of FIG. 1), a phased array device 304 (e.g., communication device 130 or communication device 200 of FIGS. 1 and 2, respectively), and a measurement device 306 (e.g., measurement device 150 of FIG. 1).

As shown in FIG. 3, the calibration process 300 includes sending, by the processing device 302 to the phased array device 304, first data 310 indicating one or more calibration instructions (e.g., initiates a calibration procedure) to be performed by the phased array device 304 (e.g., a communication device). The calibration instructions may indicate one or more antenna elements to perform a calibration procedure. For example, a series of antennas elements may systematically perform the calibration procedure. The processing device may cause the phased array device to generate and send a first periodic signal 312 using one or more antenna elements (e.g., a first antenna element) of the phased array device 304. The phased array device may generate a digital signal and apply a first signal characteristic offset to the digital signal associated with generating the periodic signal 312. In some embodiments, the periodic signal 312 is generated and sent to measurement device 306 using the one or more antenna elements of a phased array antenna of the phased array device 304. For example, the periodic signal 312 includes a periodic analog RF signal.

In some embodiments, the communication device generates a first periodic signal associated with a first antenna element based on received calibration instructions from the processing device, generates a second periodic signal by applying a first signal characteristic offset (e.g., a phase offset or an amplitude offset) associated with the first antenna to the first periodic signal. For example, a phased array antenna may generate a periodic signal internally and play the periodic signal in a continuous loop without breaks. Transmission from individual antenna element can be controlled by appropriately masking DACs.

As shown in FIG. 3, the calibration process 300 includes sending, by the phased array device 304 to the measurement device 306 second data 314 (e.g., timing data) associated with the periodic signal. In some embodiments, the processing device causes the phased array device 403 to send second data 314 (e.g., timing data) to the measurement device 306. The second data 314 may include periodic timing data indicating a frequency frame associated with the periodic signal 312. For example, timing data 314 may include a reference clock associated with phased array device 304 and/or the periodic signal (e.g., a signal clock). In another example, the timing data 314 may include a sampling rate associated with one or more of a DAC process, an up conversion process, and/or a DBF process (e.g., see FIG. 2).

As shown in FIG. 3, the calibration process 300 includes sending, by processing device 302 and receiving by measurement device 306, third data 316. The third data 316 may indicate a data acquisition parameter. The data acquisition parameter 316 may be associated with a periodicity or sampling rate of the measurement device corresponding to the first periodicity (e.g., causing data acquisition according to a data acquisition cadence). For example, the third data 316 may indicate a data acquisition rate corresponding to the periodicity of the periodic signal 312. The measurement device may perform one or more of a RF down conversion, an analog to digital conversion, and/or a digital signal process using the data acquisition parameter. For example, the data acquisition parameter may be associated with a periodic trigger. The periodic trigger may be an integer multiple of the period of the waveform of the periodic signal 312 generated by the phased array device 304. A data acquisition procedure may be synchronized with the periodicity of the periodic signal 312 such that the measurement device acquires data in associated with a rising edge of the periodic trigger. The synchronous data acquisition across periodic signal 312 generated may result in a coherent phase for each data acquisition. The data acquisition parameter 316 may indicate when to perform the next data acquisition measurement and the cadence of future data acquisition measurements.

In some embodiments, using an external trigger (e.g., data acquisition parameter 316) can introduce uncertainty due to a finite slew rate of internal trigger signal of the measurement device. As will be discussed further in association with FIGS. 4A-C, metastability can occur when the trigger edge lands proximate to an ADC clock edge of the measurement device. Metastability may include non-deterministic sampling of the periodic signal and can result in non-synchronous measurements of the periodic signal. For example, a periodic signal associated with a first antenna element may be generated and the sampling of the periodic signal (e.g., by an ADC) may not result in phase coherent result relative to sampling of a second periodic signal associated with a second antenna element. The measurement device may include an internal time trigger that is leveraged with the data acquisition parameter 316 to determine a fixed amount of time to determine in between signals from different antenna elements.

As shown in FIG. 3, the calibration process 300 includes receiving by the processing device from the measurement device, fourth data 318. The fourth data may indicate a first signal characteristic value (e.g., measured phase and/or amplitude) of the periodic signal 312 processed by the measurement device using the second data 314 and the third data 316. The signal characteristic value may correspond to a signal characteristic offset applied in the generation of periodic signal 312. In some embodiments, the signal characteristic value may be received as character encoded (e.g., ASCII) IQ data. The processing device 302 may determine a first update to the signal characteristic offset 312 based on the received signal characteristic value. The update may include a change to one or more of a phase offset and/or an amplitude offset associated with generating a digital beam associated with a first antenna element.

As shown in FIG. 3 the processing device may send fifth data 320 (e.g., update data to the phased array device. The phased array device receives the fifth data 320 indicating the update to a signal characteristic offset and updates the signal characteristic offset based on the received data. For example, data associated with the stored the values of the signal characteristic offsets may be updated with new values.

In some embodiments, receiving data indicating an update to one or more signal characteristic offsets may be received response to the processing device 302 receiving data indicating at least one of a phase or amplitude value of a periodic signal processed by the measurement device 306 using at least the periodicity data. The processing device may receive the at least one of a phase or amplitude value responsive to the processing device 302 sending data indicating a data acquisition rate corresponding to the first periodicity. (e.g., the measurement data is acquired using the data acquisition rate).

In some embodiments, the calibration process 300 may be repeated for each individual antenna element. The updates to the antenna elements may be associated with reducing (e.g., eliminating) phase differences and/or relative amplitude differences between periodic signals generated by various antenna elements and measured and processed corresponding to time-synchronous metrics. For example, the measurement device may synchronize sampling and/or triggering of data acquisition across multiple signals to represent relative phase and/or amplitude differences of two individual periodic signal as if the signals were being transmitted simultaneously.

In some embodiments, the calibration process 300 may be repeated to multiple antenna elements. For example, the processing device 302 may cause the phase array device 304 to send a second periodic signal to the measurement device using a second antenna element of the communication device. The communication device may apply a second signal characteristic offset to the second periodic signal. The processing device 302 may cause the communication device to send second timing data (e.g., data second reference clock) associated with the second periodic signal (e.g., the generation of the second periodic signal). The processing device may send a second data acquisition parameter associated with the second periodic signal. The processing device may receive data indicating a second signal characteristic value of the second periodic signal processed by the measurement device using second timing data and the second data acquisition parameter. The processing device may determine a second update to the signal characteristic offset based on the received second signal characteristic value. The processing device may send to the communication device data indicating the second update. The communication device may receive the data indicating the second update to the second signal characteristic offset. The communication device may update the second signal characteristic offset based on the received update.

In some embodiments, the calibration process 300 may be performed by each element of the of array antenna associated with the phase array device 304. The calibration process 300 may be performed sequentially for each of the antenna elements. In some embodiments, the calibration data may include instructions to calibrate multiple antenna elements and additional calibration data may not be send in between calibrating individual antenna elements. In some embodiments, the periodic signal may be uniform across the multiple antenna elements such that measurement device 306 can rely on the same timing data and/or data acquisition parameter received in associated with the calibration process 300 for a first antenna element to calibrate a second antenna element, a third antenna element, and so on.

In some embodiments, as will be discussed further in association with FIGS. 6A-B, the calibration process 300 may be associated with calibrating one or more collections of antenna elements generating a signal that propagates along a path associated with a designated direction. For example, one or more periodic signals identified herein may be flagged as a reference signal (e.g., a reference RF signal) and may be used as a comparison for determine one or more updated to the signal characteristic offsets. In another example, the processing device 302 may send data indicating a direction (e.g., an angle offset from the non-steered beam signal propagation direction). The processing device 302 may cause the phased array device 304 to send a second periodic signal to the measurement device 306 using the first antenna element. The phased array device 304 may apply a second signal characteristic offset to the second periodic signal. For example, the offset may result in the second periodic signal propagate along a path corresponding to the direction indicated in the received data. The measurement device may be disposed along the travelled signal path and may receive the second periodic signal and perform data processing procedures (e.g., RF down conversion, ADC, and DSP, etc.). The processing device may receive data indicating a second signal characteristic value of the second periodic signal processed by the measurement device when disposed along the updated signal path. The processing device may determine an update to the second signal characteristic offset based on the second signal characteristic value. The processing device may send the update and cause the phased array device to change the second signal characteristic offset associated with an antenna element and the signal propagation direction.

In some embodiments, as will be discussed further in association with FIGS. 7A-C, the periodic signal 312 may include one or more frequencies (e.g., multiple frequency tone, broadband signal, etc.). For example, the periodic signal 312 may include a first frequency and a second frequency. A first signal characteristic offset and a second signal characteristic offset may be applied to a digital beam associated with periodic signal 312. The first signal characteristic offset may be associated with a first frequency and the second signal characteristic offset may be associated with a second frequency. The processing device 302 may further receive data indicating a first signal characteristic value associated with the first frequency and a second signal characteristic value associated with the second frequency both measured values of the periodic signal 312. Processing device may determine a first update to a first signal characteristic offset associated and a second update to the second signal characteristic offset and may cause the phased array device to update the first signal characteristic offset and the second signal characteristic offset accordingly.

Figure 4A:
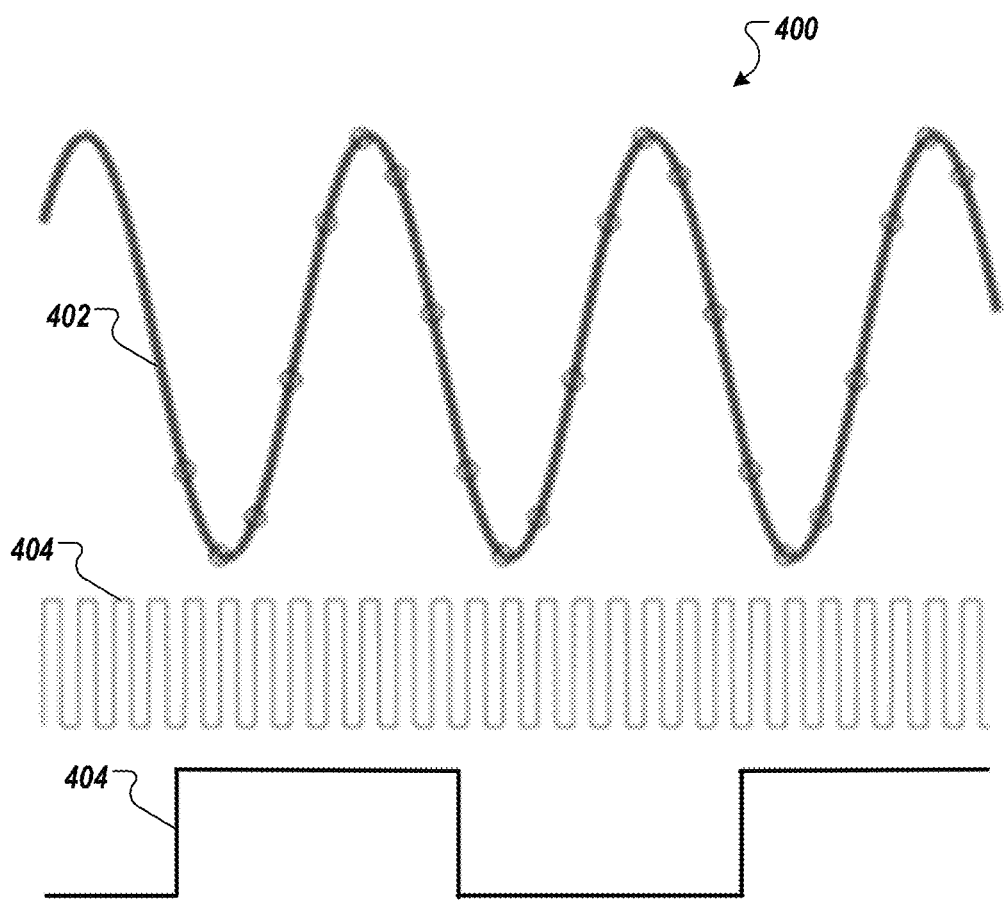
FIGS. 4A-C illustrate a collection of signals processed during a phased array antenna calibration procedure, according to embodiments of the present disclosure.
Figure 4B:
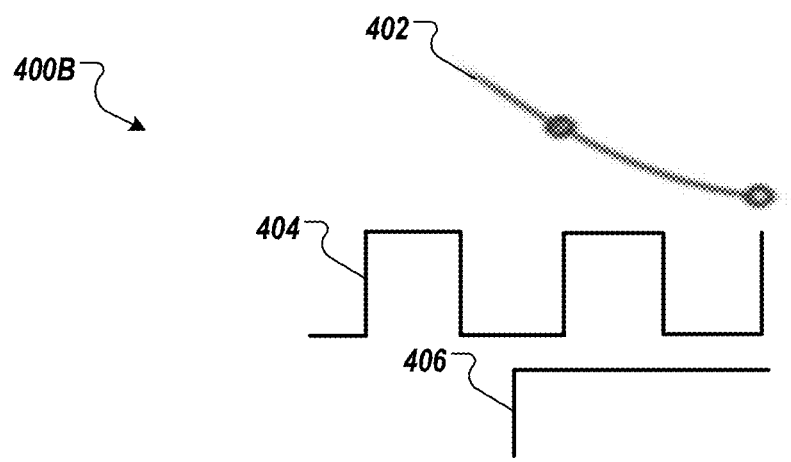
Figure 4C:
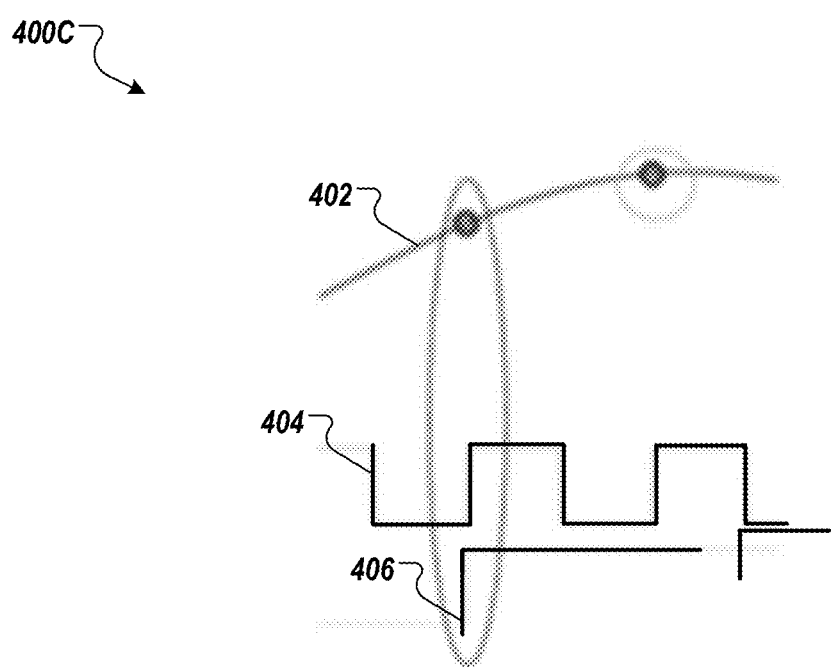

FIGS. 4A-C illustrate a collection of signals 400A processed during a phased array antenna calibration procedure, according to embodiments of the present disclosure. FIG. 4A illustrates a based band signal 402, a clock signal 404, and a trigger signal 406. FIG. 4B illustrates a stable condition 400B when the trigger occurs a distance from a clock edge. FIG. 4C illustrates an unstable condition 400C when the trigger occurs close to a clock edge (e.g., unstable condition). The baseband signal 402 may include a signal derived from down converting a periodic analog RF signal received by a measurement device (e.g., measurement device 150 of FIG. 1, a VSA) from a phased array antenna (e.g., communication device 130 of FIG. 1, phase array device 304 of FIG. 3). The clock signal 404 may include a reference clock (e.g., periodicity data) received by a measurement device from a phased array device or a processing device associated with generating a periodic generated associated with the baseband signal 402. The trigger signal 404 may be associated with an internal clock of a measurement device As described in other embodiments, avoiding metastability can assist in preventing non-synchronous measurements associated with periodic signal generated by different antenna elements (or collections of antenna elements). Metastability may occur when a trigger edge (e.g., of trigger signal 406) lands too close to the ADC clock edge (e.g., clock signal of a measurement device (e.g., measurement device 150 of FIG. 1, vector signal analyzer (VSA)) such as illustrated in FIG. 2B. Metastability may be overcome by using an internal time trigger capability associated with the measurement device. For example, a measurement device may count the ADC sampling clock (e.g., periodicity) and trigger every N cycles of the clock, where N is an integer value of 2 or more. Some embodiment, avoid metastability by bounding delay spread in the DBF to minimize overall "clock spillage" or desynchronization of a phased array signal generation process and a measurement device digital signal processing procedure.

In some embodiments, a measurement device (e.g., measurement device 150 of FIG. 1) may be caused to change a trigger method to an internal triggering method and set a repetition frequency (e.g., data acquisition periodicity) to an integer multiples of the based signal period. The measurement device triggers data acquisition based on its own internal clock using a reference signal (e.g., reference clock or periodicity data) associated with a phased array device generating an associated periodic signal.

Figure 5A:
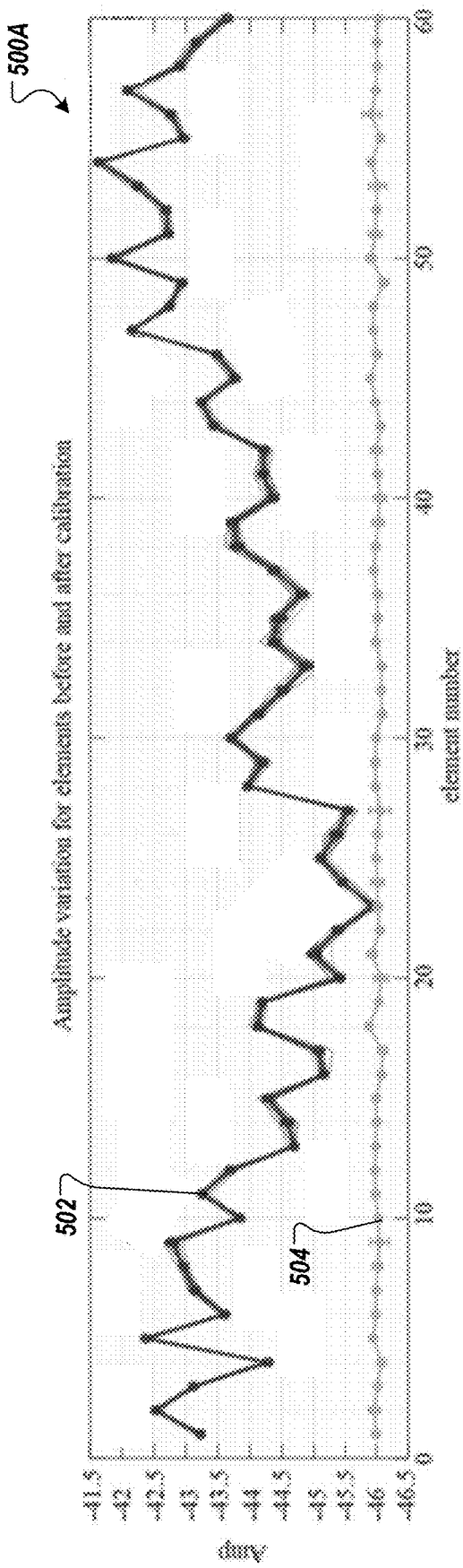
FIGS. 5A-B, illustrate graphs indicating various signal characteristic values of a signal generated by phased array antenna elements before and after a calibration procedure, according to embodiments of the present disclosure.
Figure 5B:
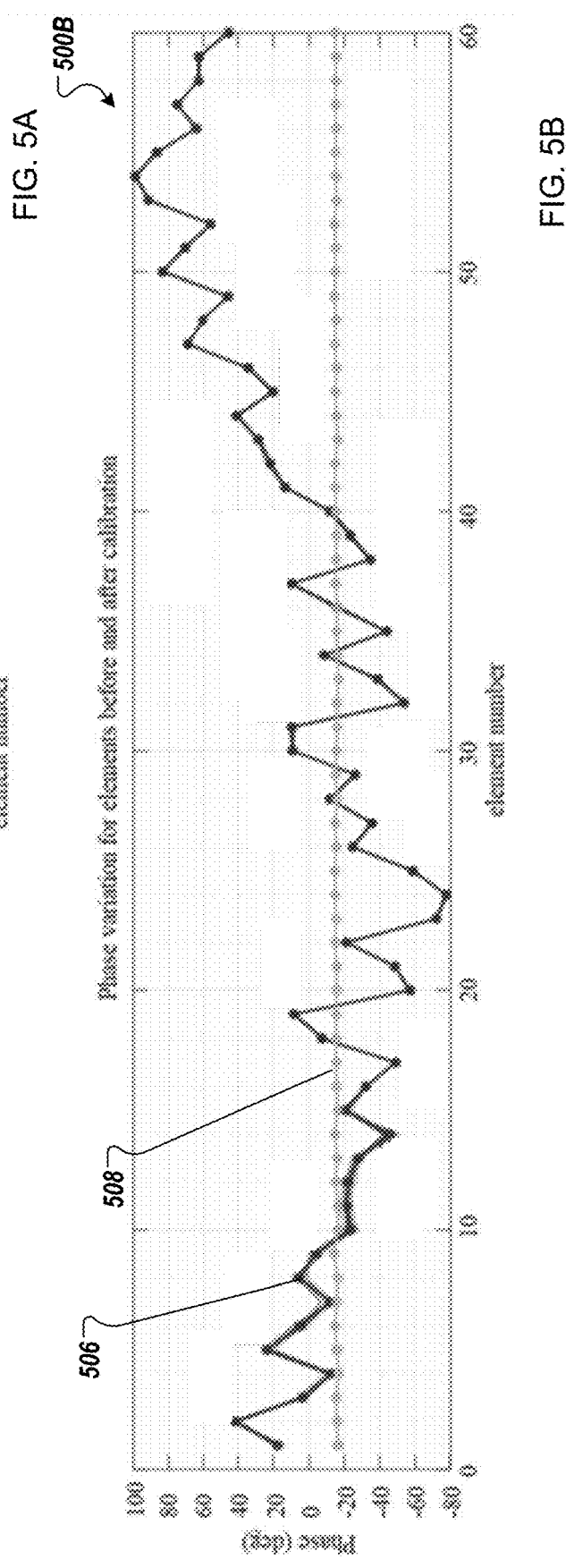

FIGS. 5A-B, illustrate graphs 500A-B indicating various signal characteristic values of a signal generated by phased array antenna elements before and after a calibration procedure, according to embodiments of the present disclosure. FIG. 5A is a graph depicting relative amplitude variation of signals measured from individual antenna element before and after a calibration procedure. FIG. 5A is a graph depicting relative amplitude variation of signals measured from individual antenna element before and after a calibration procedure.

As noted previously, a calibration procedure (e.g., process 300 of FIG. 3) may be leveraged to individually tune a signal characteristic offset (e.g., a phase offset and/or an amplitude offset). As shown in FIG. 5A, a first data series 502 indicating one or more relative amplitude values of signals generated by various elements (e.g., "element number") prior to a calibration process (e.g., process 300 of FIG. 3). A second data series 504 indicates one or more relative amplitude values of signals generated by various element (e.g., "element number") after a calibration procedure. In some embodiments, the amplitudes are tuned to the smallest relative amplitude value. For example, second data series 504 is tuned to a relative amp of −46 approximately the smallest relative amplitude across all data points in the first data series 502. In some embodiments, the relative amplitude values are tuned to the highest relative amplitude value, however, in other embodiments the relative amplitude values may be tuned to one or more statistical values (e.g., a mean, medium, threshold percentile, etc.) of the first data series 502.

As shown in FIG. 5B, a third data series 506 indicating one or more relative phase values of signals generated by various elements (e.g., "element number") prior to a calibration process (e.g., process 300 of FIG. 3). A fourth data series 508 indicates one or more relative phase values of signals generated by various element (e.g., "element number") after a calibration procedure. In some embodiments, the relative phase values are tuned to the lowest relative phase value. In some embodiments the relative phases are tuned to the highest relative phase value, however, in other embodiments the relative phase values may be tuned to one or more statistical values (e.g., mean, medium, threshold percentile, etc.) of the first data series 502. For example, fourth data series 508 is tuned to a relative phase value of −20 approximately an average of all relative phase values of the third data series.

Figure 6A:
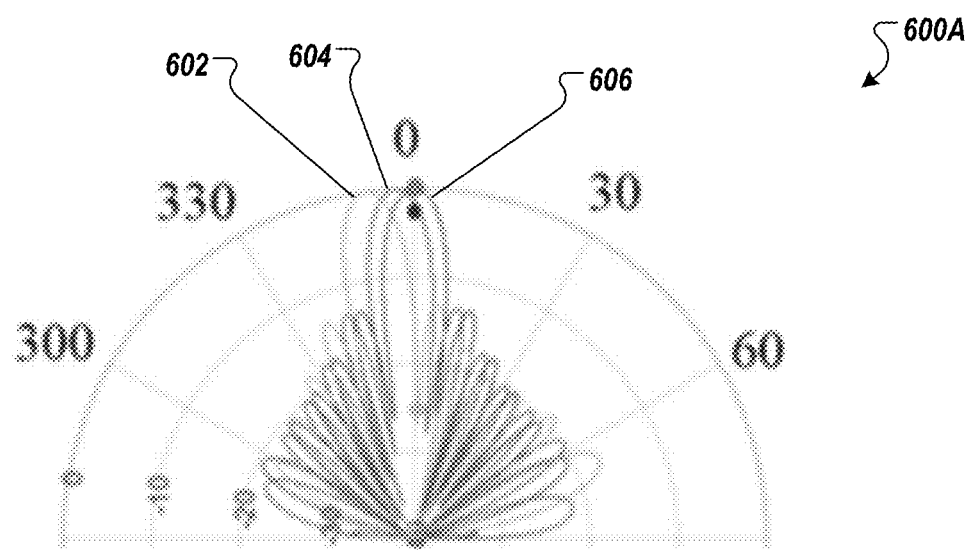
FIGS. 6A-B illustrate a signal pattern of a signal generated using an array antenna across multiple propagation directions, according to embodiments of the present disclosure.
Figure 6B:
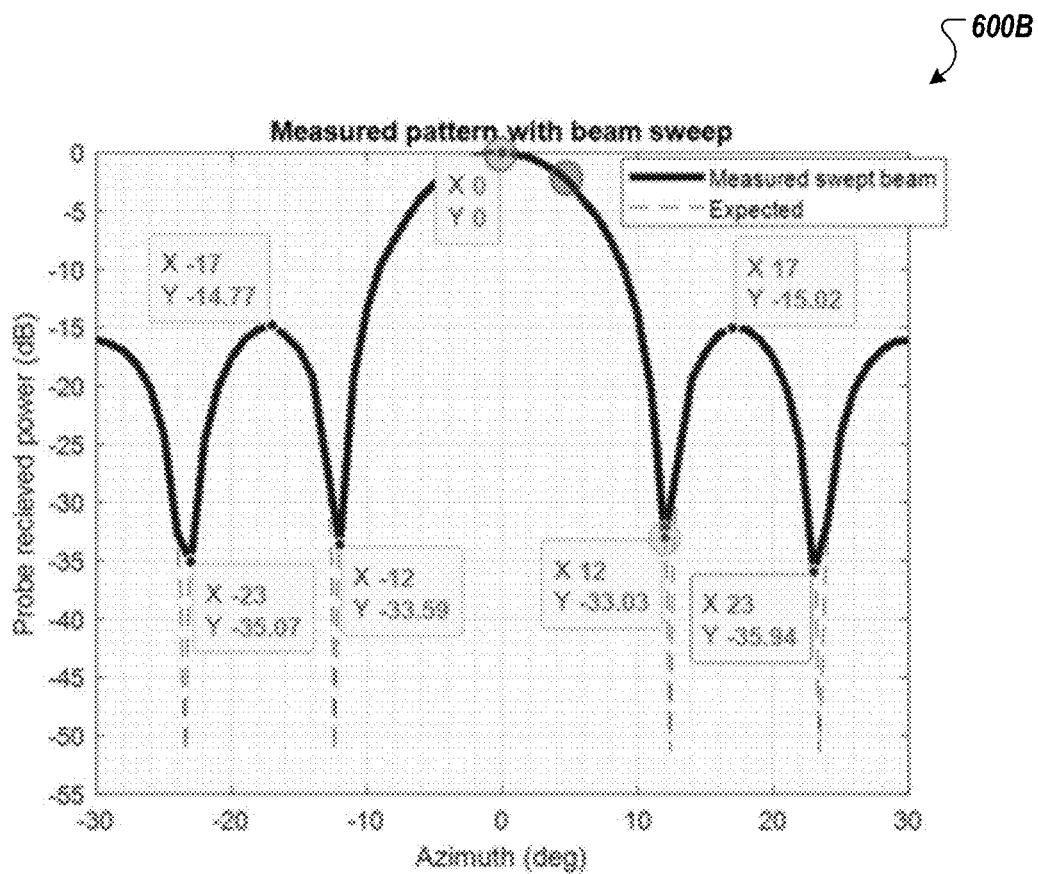

FIGS. 6A-B illustrate signal pattern of a beam 600A-B generated using an array antenna across multiple propagation directions, according to embodiments of the present disclosure. A measurement device (e.g., measurement device 150 of FIG. 1) may be disposed across multiple propagation directions. For example, a measurement device may measure one or more parameter (e.g., phase and/or amplitude) of a signal in multiple directions. The steering of the beam may result in different measured signal parameters. For example, an amplitude of a beam measured at broadside while pointed at broadside (e.g., steered in the direction to propagate along a broadside trajectory) is likely to have a larger amplitude than a beam measured at broadside but pointing in a direction off-center from broadside. As will be discussed, antenna elements may be used to steer a beam across multiple angles to calibrate and/or verify a calibration procedures. In some embodiments, the measurement device may be at a fixed location and a phased array device may be used to steer the beam to make the measurement (e.g., as illustrated in FIGS. 6A-B).

FIG. 6A shows multiple beams 602, 604, 606 pointing in multiple direction while being measured at broadside. FIG. 6B shows the relative power of the multiple beams. A first beam 606 is a beam that is pointing at broadside and the parameter values are read at broadside. Beam 606 is steered away from broadside to generate beam 604 (measured at broadside). Beam 604 is steered further away from broadside to generate beam 602 (measured at broadside). The relative power of the beams 602, 604, 606 is predictively reduced as the beam is directed away from broadside. In some embodiments, calibration of a beam signal may not only be limited to measurements of beams measured in the direction they are pointing. For example, signal characteristic values of individual signal may be measured for signal used to steer a beam in a desired direction.

In some embodiments, as described previously, a calibration procedure may be performed to tune one or more signal characteristic offsets (e.g., a phase offset and/or an amplitude offset) associated with individual antenna elements (or collections of antenna elements) such as, for example, to maximize phase coherence of a beam (e.g., beams 602, 604, 606) and minimize relative amplitude difference of various individual signal of the beam.

In some embodiments, a calibration process (e.g., process 300) may be associated with calibrating one or more collections of antenna elements generating a signal that propagates along a path associated with a designated direction. For example, the processing device may facilitate signal generation along the designated direction and receive signal characteristic data associated with the receive signal received by a measurement device disposed along the designated signal propagation direction. For example, a signal characteristic offset may result in the second periodic signal propagates along a path corresponding to the desired direction. As indicated, the measurement device may be disposed along the travelled signal path and may receive a periodic signal and perform data processing procedures (e.g., RF down conversion, ADC, and DSP, etc.). The processing device may receive data indicating a signal characteristic value of the second periodic signal processed by the measurement device when disposed along the updated signal path. The processing device may determine an update to the signal characteristic offset based on the signal characteristic value. The processing device may send the update and cause a phased array device to change the signal characteristic offset associated with an antenna element and the signal propagation direction. Calibration of the antenna element may be performed in association of multiple steered beam direction for veracity of the calibration process and/or increased precision of the updated signal characteristic offset(s).

Figure 7A:
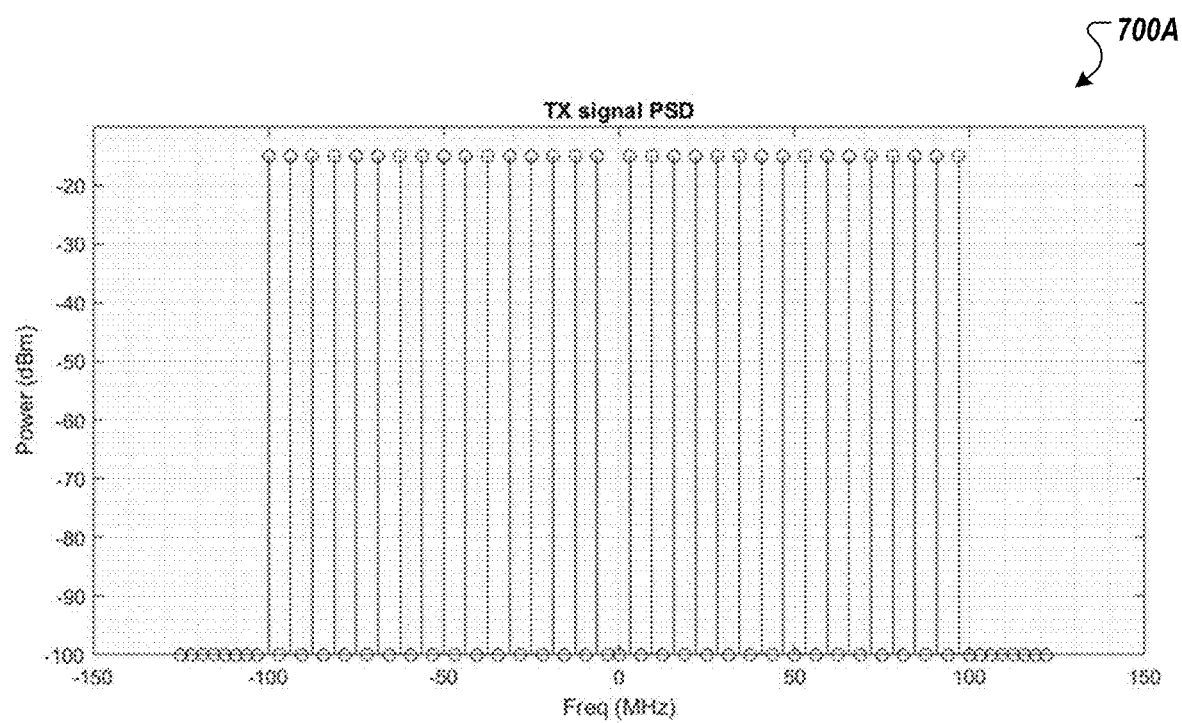
FIG. 7A-C illustrate depicts graphs illustrating various multi-tone frequency signals generated using an array antenna, according to embodiments of the present disclosure.
Figure 7B:
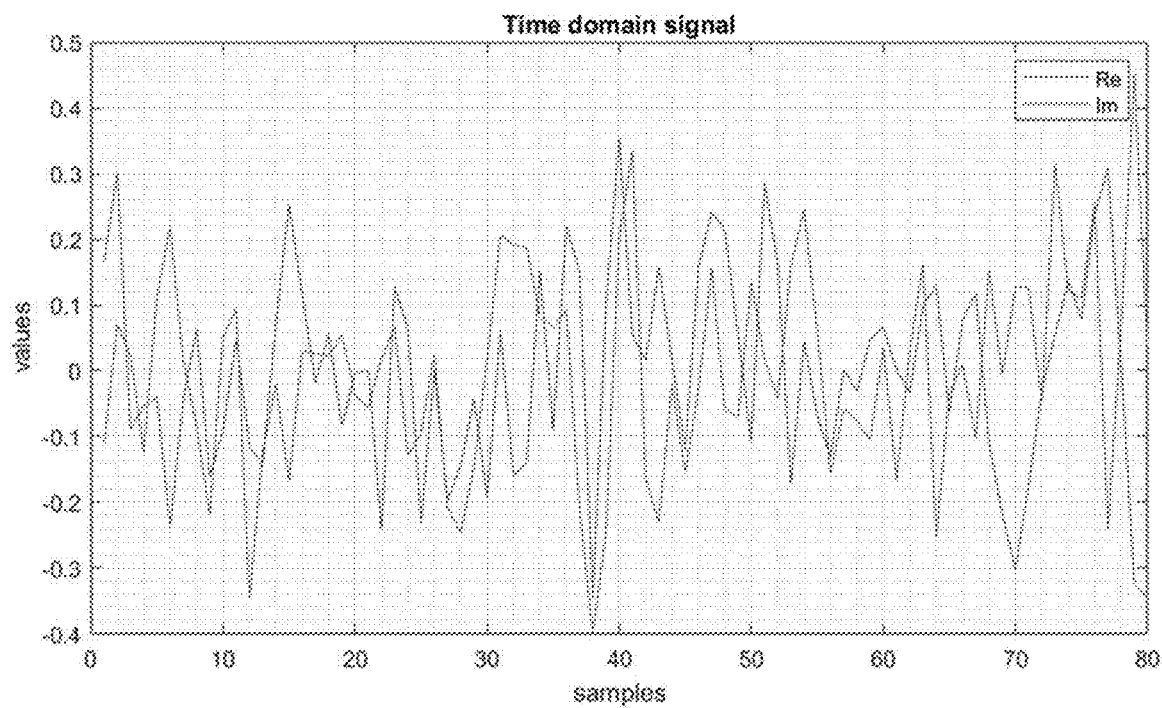
Figure 7C:
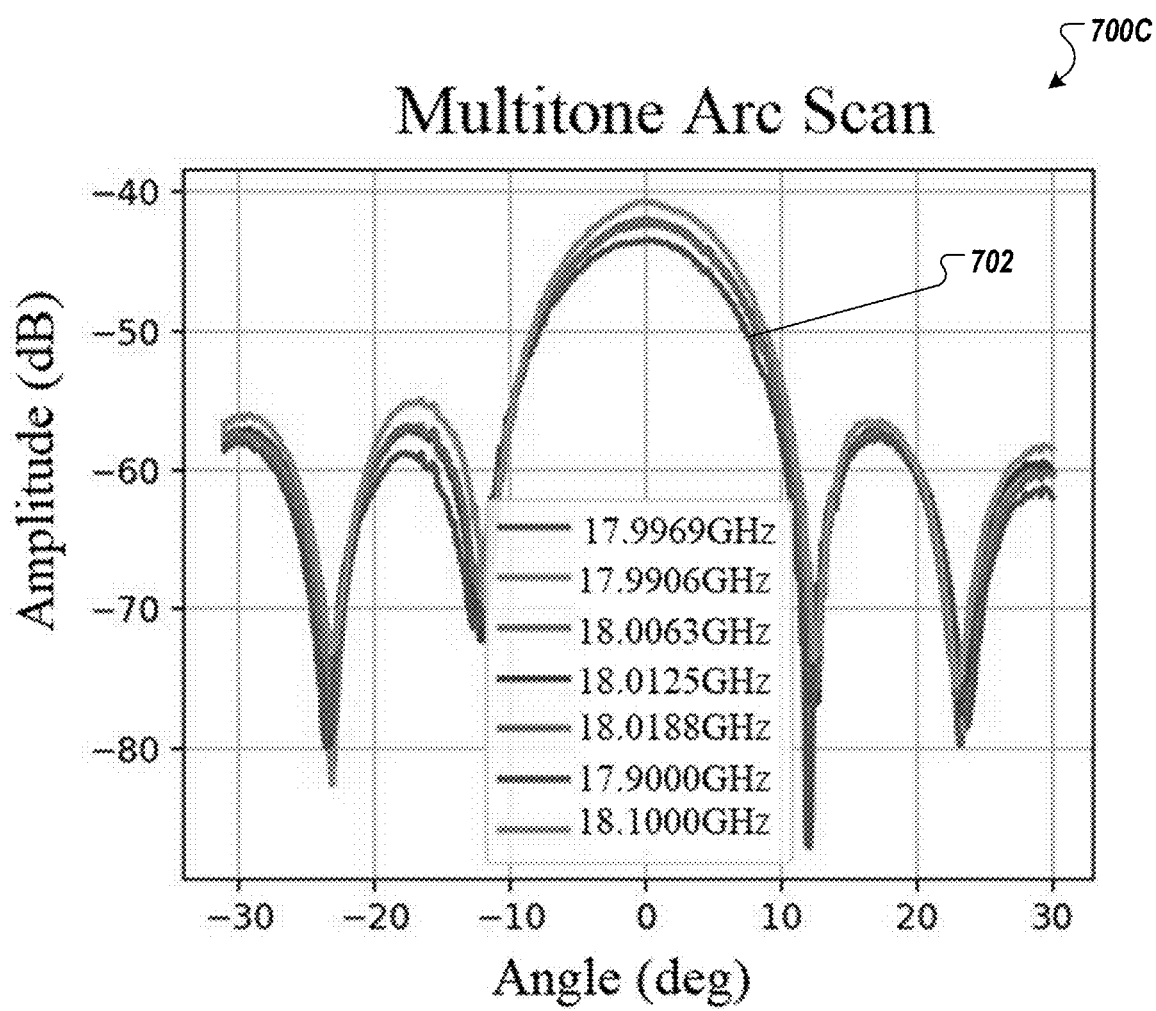

FIG. 7A-C illustrate depicts graphs 700A-C illustrating various multi-tone frequency signals generated using an array antenna, according to embodiments of the present disclosure. As noted previously, one or more of the presented embodiments allows for multi-tone calibration of a digitally formed beams elements without needing to perform individual calibration steps for individual frequencies (e.g., a beam sweep). One or more of the presented systems and/or methodologies may leverage the use of a multi-tone signal 700A-B as shown in FIGS. 7A-B. One or more signal characteristic offsets may be associated with an individual frequency tone and individually be tuned using the same combined periodic signal transmitted from a phase array device to a measurement device via an antenna element. For example, a tone 100 MHz away from an initial tone can include a different calibration value (e.g., a signal characteristic offset such as a phase offset and/or an amplitude offset).

In some embodiments, the multitone calibration may be performed across a bandwidth with one calibration iteration (e.g., one iteration of process 300 of FIG. 3). Using a multitone signal, the phase and magnitude for all of the tones in a bandwidth are calculated. For example, as shown in FIG. 7A, a 200 MHz bandwidth may be used. In another example, a bandwidth larger than 200 MHz may be used. One or more of the embodiments described herein may be leveraged to calibrate the entire bandwidth in a single calibration iteration by transmitting a wideband signal to a measurement device and receiving associated signal characteristic values (e.g., phase and/or amplitude values) for each individual frequency. Multiple updates to individual signal characteristic offset may be determined by a processing device and updated by a phased array device associated with generating the wideband signal. All frequencies may be updated in temporal proximity to each other without further sending additional periodic signals.

In some embodiments, a calibration system (e.g., communication system 100 of FIG. 1) may be leveraged to calculate the phase delay of individual elements. In some embodiments, as described previously, calibration of antenna elements can be performed by turning on each element one by one and measuring signal characteristic values by a measurement device. However, in other embodiments, a phased array device may generate a multitone signal with each tone sharing a common periodicity. As noted previously, a phased array device may transmit data indicating a signal reference frame (e.g., a frequency frame) to a measurement device. The measurement device may follow one or more data acquisition procedures such as those presented in associated with FIGS. 4A-C. The wideband maybe generated and sent by the phase array device to the measurement time with each tone being measured in temporal proximity one to another. Data indicating one or more signal characteristic values may be determined for each of the frequency tones. The relative phase may be used by a processing device to determine a relative delay between signals propagating from different DBF devices. For example, individual DAC chains may delay a signal for a different time duration which can be determined from the relative phase differences of the individual bands of the wideband signal measured by the measurement device (e.g., using the periodicity and data acquisition parameters previously described).

As shown in FIG. 7C, multiple frequency tones 702 may be measured and calibration of each of the DAC chains and antenna elements may be validated. For example, updated signal characteristic offsets (e.g., phase offsets and/or amplitude offsets) may be employed to generate a signal that is substantially phase coherent with substantially no relative amplitude difference. In some embodiments, such as those depicted in FIG. 7C, described calibration procedures can enable wide-band "one-shot" calibration and beam pattern measurement with the ability to measure and compensate for delay and, in some multi-tone embodiments, compensate the frequency dependent phase for all frequencies in a frequency band.

In some embodiments, one or more of the phase and/or amplitude values associated with the various antenna elements used in the calibration procedure may undergo a deviation over time. This is sometimes referred to as a drift (e.g., phase drift). When the array of elements are turned on a temperature drift across the elements can result in a phase drift. The timing of the calibration procedure may result in more or less drift (e.g., a quicker calibration procedure involving lets iterations may result in less drift over the course of the calibration procedure). The multiple frequency tones 702 may be leveraged to perform a calibration procedure with less iterative steps (e.g., "one-shot" calibration) and as a result my limit (e.g., minimize) overall drift across the antenna elements.

Figure 8:
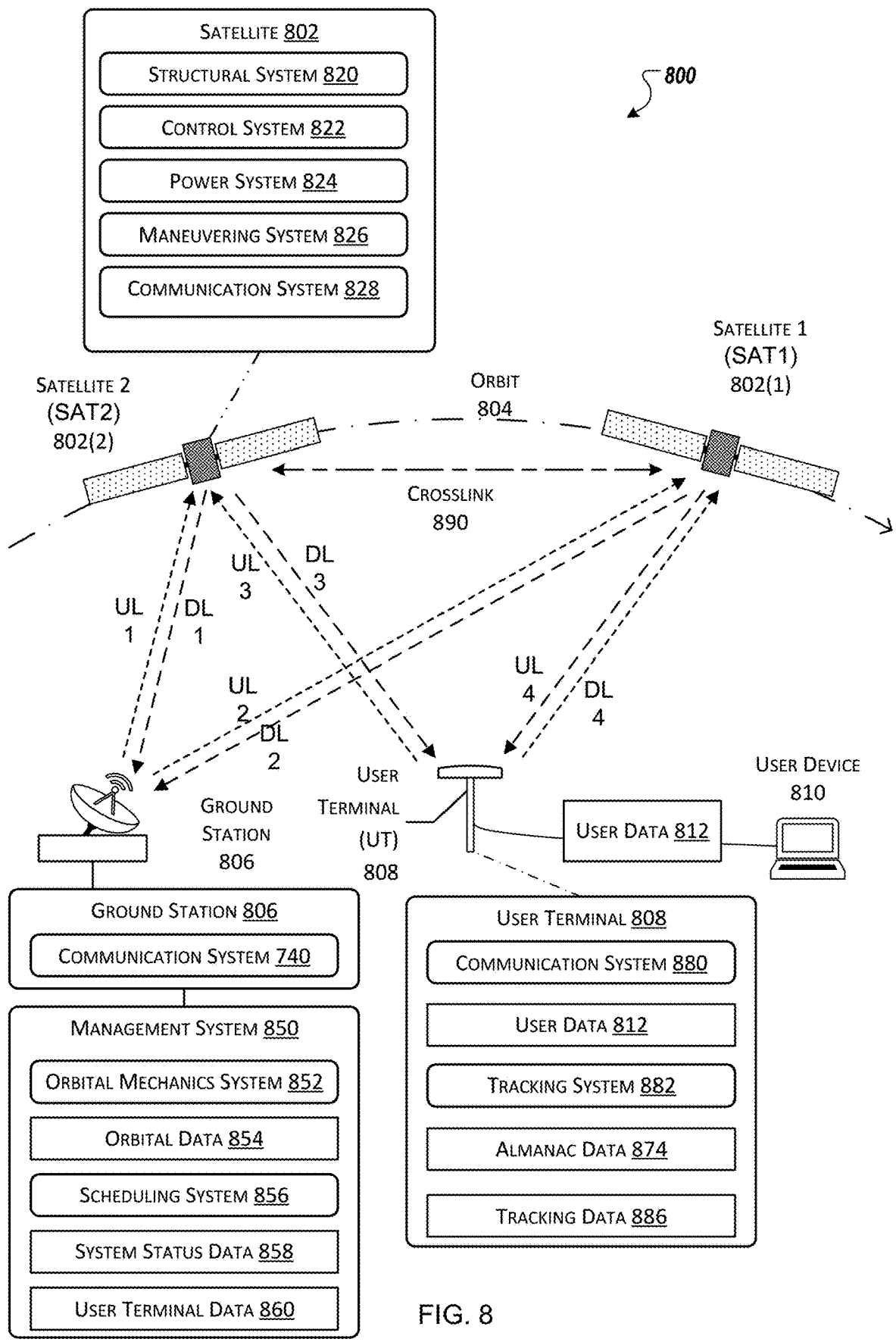
FIG. 8 illustrates a portion of a communication system that includes two satellites of a constellation of satellites, each satellite being in orbit, according to embodiments of the present disclosure.

FIG. 8 illustrates a portion of a communication system 800 that includes two satellites of a constellation of satellites 802(1), 802(2), . . . , 802(S), each satellite 802 being in orbit 804 according to embodiments of the present disclosure. The system 800 shown here comprises a plurality (or "constellation") of satellites 802(1), 802(2), . . . , 802(S), each satellite 802 being in orbit 804. Any of the satellites 802 can include the communication system 100 or communication device 200 of FIGS. 1 and 2, as well as other array antennas and Tx DBF devices described herein. Also shown is a ground station 806, user terminal (UT) 808, and a user device 810.

The constellation may comprise hundreds or thousands of satellites 802, in various orbits 804. For example, one or more of these satellites 802 may be in non-geosynchronous orbits (NGOs) in which they are in constant motion with respect to the Earth. For example, the orbit 804 is a low earth orbit (LEO). In this illustration, orbit 804 is depicted with an arc pointed to the right. A first satellite (SAT1) 1302(1) is leading (ahead of) a second satellite (SAT2) 802(2) in the orbit 804.

The satellite 802 may comprise a structural system 820, a control system 822, a power system 824, a maneuvering system 826, and a communication system 828 described herein. In other implementations, some systems may be omitted or other systems added. One or more of these systems may be communicatively coupled with one another in various combinations.

The structural system 820 comprises one or more structural elements to support operation of the satellite 802. For example, the structural system 820 may include trusses, struts, panels, and so forth. The components of other systems may be affixed to, or housed by, the structural system 820. For example, the structural system 820 may provide mechanical mounting and support for solar panels in the power system 824. The structural system 820 may also provide for thermal control to maintain components of the satellite 1302 within operational temperature ranges. For example, the structural system 820 may include louvers, heat sinks, radiators, and so forth.

The control system 822 provides various services, such as operating the onboard systems, resource management, providing telemetry, processing commands, and so forth. For example, the control system 822 may direct operation of the communication system 828.

The power system 824 provides electrical power for operation of the components onboard the satellite 802. The power system 824 may include components to generate electrical energy. For example, the power system 824 may comprise one or more photovoltaic cells, thermoelectric devices, fuel cells, and so forth. The power system 824 may include components to store electrical energy. For example, the power system 824 may comprise one or more batteries, fuel cells, and so forth.

The maneuvering system 826 maintains the satellite 802 in one or more of a specified orientation or orbit 804. For example, the maneuvering system 826 may stabilize the satellite 802 with respect to one or more axis. In another example, the maneuvering system 826 may move the satellite 802 to a specified orbit 804. The maneuvering system 826 may include one or more computing devices, sensors, thrusters, momentum wheels, solar sails, drag devices, and so forth. For example, the sensors of the maneuvering system 826 may include one or more global navigation satellite system (GNSS) receivers, such as global positioning system (GPS) receivers, to provide information about the position and orientation of the satellite 802 relative to Earth. In another example, the sensors of the maneuvering system 826 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 828 provides communication with one or more other devices, such as other satellites 802, ground stations 806, user terminals 808, and so forth. The communication system 828 may include one or more modems, digital signal processors, power amplifiers, antennas (including at least one antenna that implements multiple antenna elements, such as a phased array antenna, and including an embedded calibration antenna, such as the calibration antenna 804 as described herein), processors, memories, storage devices, communications peripherals, interface buses, and so forth. Such components support communications with other satellites 802, ground stations 806, user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 828 may be output to other systems, such as to the control system 822, for further processing. Output from a system, such as the control system 822, may be provided to the communication system 828 for transmission.

One or more ground stations 806 are in communication with one or more satellites 802. The ground stations 806 may pass data between the satellites 802, a management system 850, networks such as the Internet, and so forth. The ground stations 806 may be emplaced on land, on vehicles, at sea, and so forth. Each ground station 806 may comprise a communication system 840. Each ground station 806 may use the communication system 840 to establish communication with one or more satellites 802, other ground stations 806, and so forth. The ground station 806 may also be connected to one or more communication networks. For example, the ground station 806 may connect to a terrestrial fiber optic communication network. The ground station 806 may act as a network gateway, passing user data 812 or other data between the one or more communication networks and the satellites 802. Such data may be processed by the ground station 806 and communicated via the communication system 840. The communication system 840 of a ground station may include components similar to those of the communication system 828 of a satellite 802 and may perform similar communication functionalities. For example, the communication system 840 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 806 are in communication with a management system 850. The management system 850 is also in communication, via the ground stations 806, with the satellites 802 and the UTs 808. The management system 850 coordinates operation of the satellites 802, ground stations 806, UTs 808, and other resources of the system 800. The management system 850 may comprise one or more of an orbital mechanics system 852 or a scheduling system 856. In some embodiments, the scheduling system 856 can operate in conjunction with an HD controller.

The orbital mechanics system 852 determines orbital data 854 that is indicative of a state of a particular satellite 802 at a specified time. In one implementation, the orbital mechanics system 852 may use orbital elements that represent characteristics of the orbit 804 of the satellites 802 in the constellation to determine the orbital data 854 that predicts location, velocity, and so forth of particular satellites 802 at particular times or time intervals. For example, the orbital mechanics system 852 may use data obtained from actual observations from tracking stations, data from the satellites 802, scheduled maneuvers, and so forth to determine the orbital elements. The orbital mechanics system 852 may also consider other data, such as space weather, collision mitigation, orbital elements of known debris, and so forth.

The scheduling system 856 schedules resources to provide communication to the UTs 808. For example, the scheduling system 856 may determine handover data that indicates when communication is to be transferred from the first satellite 802(1) to the second satellite 802(2). Continuing the example, the scheduling system 856 may also specify communication parameters such as frequency, timeslot, and so forth. During operation, the scheduling system 856 may use information such as the orbital data 854, system status data 858, user terminal data 860, and so forth.

The system status data 858 may comprise information such as which UTs 808 are currently transferring data, satellite availability, current satellites 802 in use by respective UTs 808, capacity available at particular ground stations 806, and so forth. For example, the satellite availability may comprise information indicative of satellites 802 that are available to provide communication service or those satellites 802 that are unavailable for communication service. Continuing the example, a satellite 802 may be unavailable due to malfunction, previous tasking, maneuvering, and so forth. The system status data 858 may be indicative of past status, predictions of future status, and so forth. For example, the system status data 858 may include information such as projected data traffic for a specified interval of time based on previous transfers of user data 812. In another example, the system status data 858 may be indicative of future status, such as a satellite 802 being unavailable to provide communication service due to scheduled maneuvering, scheduled maintenance, scheduled decommissioning, and so forth.

The user terminal data 860 may comprise information such a location of a particular UT 808. The user terminal data 860 may also include other information such as a priority assigned to user data 812 associated with that UT 808, information about the communication capabilities of that particular UT 808, and so forth. For example, a particular UT 808 in use by a business may be assigned a higher priority relative to a UT 808 operated in a residential setting. Over time, different versions of UTs 808 may be deployed, having different communication capabilities such as being able to operate at particular frequencies, supporting different signal encoding schemes, having different antenna configurations, and so forth.

The UT 808 includes a communication system 880 to establish communication with one or more satellites 802. The communication system 880 of the UT 808 may include components similar to those of the communication system 828 of a satellite 802 and may perform similar communication functionalities. For example, the communication system 880 may include one or more modems, digital signal processors, power amplifiers, antennas (including at least one antenna that implements multiple antenna elements, such as a phased array antenna), processors, memories, storage devices, communications peripherals, interface buses, and so forth. The UT 808 passes user data 812 between the constellation of satellites 802 and the user device 810. The user data 812 includes data originated by the user device 810 or addressed to the user device 810. The UT 808 may be fixed or in motion. For example, the UT 808 may be used at a residence, or on a vehicle such as a car, boat, aerostat, drone, airplane, and so forth.

The UT 808 includes a tracking system 882. The tracking system 882 uses almanac data 884 to determine tracking data 886. The almanac data 884 provides information indicative of orbital elements of the orbit 804 of one or more satellites 802. For example, the almanac data 884 may comprise orbital elements such as "two-line element" data for the satellites 802 in the constellation that are broadcast or otherwise sent to the UTs 808 using the communication system 880.

The tracking system 882 may use the current location of the UT 808 and the almanac data 884 to determine the tracking data 886 for the satellite 802. For example, based on the current location of the UT 808 and the predicted position and movement of the satellites 802, the tracking system 882 is able to calculate the tracking data 886. The tracking data 886 may include information indicative of azimuth, elevation, distance to the second satellite, time of flight correction, or other information at a specified time. The determination of the tracking data 886 may be ongoing. For example, the first UT 808 may determine tracking data 886 every 1300 ms, every second, every five seconds, or at other intervals.

With regard to FIG. 8, an uplink is a communication link which allows data to be sent to a satellite 802 from a ground station 806, UT 1308, or device other than another satellite 802. Uplinks are designated as UL1, UL2, UL3 and so forth. For example, UL1 is a first uplink from the ground station 806 to the second satellite 1302(2). In comparison, a downlink is a communication link which allows data to be sent from the satellite 802 to a ground station 806, UT 808, or device other than another satellite 802. For example, DL1 is a first downlink from the second satellite 802(2) to the ground station 806. The satellites 802 may also be in communication with one another. For example, a crosslink 890 provides for communication between satellites 802 in the constellation.

The satellite 802, the ground station 806, the user terminal 808, the user device 810, the management system 850, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 9:
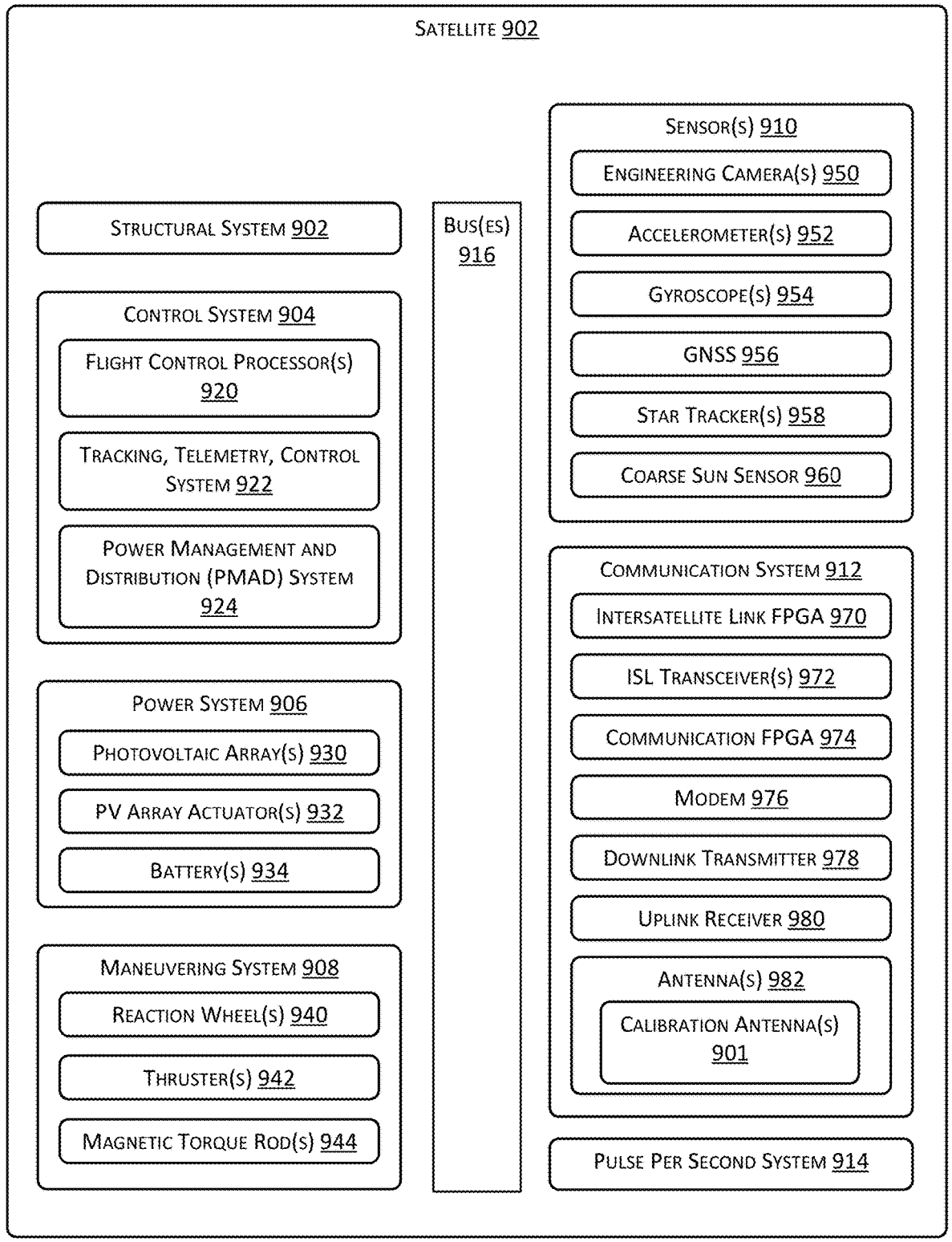
FIG. 9 is a functional block diagram of some systems associated with the satellite, according to some implementations.

FIG. 9 is a functional block diagram of some systems associated with the satellite 802, according to some implementations. The satellite 802 may comprise a structural system 902, a control system 904, a power system 906, a maneuvering system 908, one or more sensors 910, and a communication system 912. A pulse per second (PPS) system 914 may be used to provide timing reference to the systems onboard the satellite 802. One or more busses 916 may be used to transfer data between the systems onboard the satellite 802. In some implementations, redundant busses 916 may be provided. The busses 916 may include, but are not limited to, data busses such as Controller Area Network Flexible Data Rate (CAN FD), Ethernet, Serial Peripheral Interface (SPI), and so forth. In some implementations the busses 916 may carry other signals. For example, a radio frequency bus may comprise coaxial cable, waveguides, and so forth to transfer radio signals from one part of the satellite 802 to another. In other implementations, some systems may be omitted or other systems added. One or more of these systems may be communicatively coupled with one another in various combinations.

The structural system 902 comprises one or more structural elements to support operation of the satellite 802. For example, the structural system 902 may include trusses, struts, panels, and so forth. The components of other systems may be affixed to, or housed by, the structural system 902. For example, the structural system 902 may provide mechanical mounting and support for solar panels in the power system 906. The structural system 902 may also provide for thermal control to maintain components of the satellite 802 within operational temperature ranges. For example, the structural system 902 may include louvers, heat sinks, radiators, and so forth.

The control system 904 provides various services, such as operating the onboard systems, resource management, providing telemetry, processing commands, and so forth. For example, the control system 904 may direct operation of the communication system 912. The control system 904 may include one or more flight control processors 920. The flight control processors 920 may comprise one or more processors, FPGAs, and so forth. A tracking, telemetry, and control (TTC) system 922 may include one or more processors, radios, and so forth. For example, the TTC system 922 may comprise a dedicated radio transmitter and receiver to receive commands from a ground station 806, send telemetry to the ground station 806, and so forth. A power management and distribution (PMAD) system 924 may direct operation of the power system 906, control distribution of power to the systems of the satellite 802, control battery 934 charging, and so forth.

The power system 906 provides electrical power for operation of the components onboard the satellite 802. The power system 906 may include components to generate electrical energy. For example, the power system 906 may comprise one or more photovoltaic arrays 930 comprising a plurality of photovoltaic cells, thermoelectric devices, fuel cells, and so forth. One or more PV array actuators 932 may be used to change the orientation of the photovoltaic array(s) 930 relative to the satellite 1802. For example, the PV array actuator 932 may comprise a motor. The power system 906 may include components to store electrical energy. For example, the power system 906 may comprise one or more batteries 934, fuel cells, and so forth.

The maneuvering system 908 maintains the satellite 802 in one or more of a specified orientation or orbit 804. For example, the maneuvering system 908 may stabilize the satellite 802 with respect to one or more axes. In another example, the maneuvering system 908 may move the satellite 802 to a specified orbit 804. The maneuvering system 908 may include one or more of reaction wheel(s) 940, thrusters 942, magnetic torque rods 944, solar sails, drag devices, and so forth. The thrusters 942 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 906 to expel the water and produce thrust. During operation, the maneuvering system 908 may use data obtained from one or more of the sensors 910.

The satellite 802 includes one or more sensors 910. The sensors 910 may include one or more engineering cameras 950. For example, an engineering camera 950 may be mounted on the satellite 802 to provide images of at least a portion of the photovoltaic array 930. Accelerometers 952 provide information about acceleration of the satellite 802 along one or more axes. Gyroscopes 954 provide information about rotation of the satellite 802 with respect to one or more axes. The sensors 910 may include a global navigation satellite system (GNSS) 956 receiver, such as Global Positioning System (GPS) receiver, to provide information about the position of the satellite 802 relative to Earth. In some implementations the GNSS 956 may also provide information indicative of velocity, orientation, and so forth. One or more star trackers 958 may be used to determine an orientation of the satellite 802. A coarse sun sensor 960 may be used to detect the sun, provide information on the relative position of the sun with respect to the satellite 802, and so forth. The satellite 802 may include other sensors 910 as well. For example, the satellite 802 may include a horizon detector, radar, lidar, and so forth.

The communication system 912 provides communication with one or more other devices, such as other satellites 802, ground stations 806, user terminals 808, and so forth. The communication system 912 may include one or more modems 976, digital signal processors, power amplifiers, antennas 982 (including at least one antenna that implements multiple antenna elements, such as a phased array antenna such as the antenna elements 148 of FIG. 1), processors, memories, storage devices, communications peripherals, interface buses, and so forth. Such components support communications with other satellites 802, ground stations 806 user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 912 may be output to other systems, such as to the control system 904, for further processing. Output from a system, such as the control system 904, may be provided to the communication system 912 for transmission.

The communication system 912 may include hardware to support the intersatellite link 890. For example, an intersatellite link FPGA 970 may be used to modulate data that is sent and received by an ISL transceiver 972 to send data between satellites 902. The ISL transceiver 972 may operate using radio frequencies, optical frequencies, and so forth.

A communication FPGA 974 may be used to facilitate communication between the satellite 802 and the ground stations 806, UTs 808, and so forth. For example, the communication FPGA 974 may direct operation of a modem 976 to modulate signals sent using a downlink transmitter 978 and demodulate signals received using an uplink receiver 980. The satellite 802 may include one or more antennas 982. For example, one or more parabolic antennas may be used to provide communication between the satellite 802 and one or more ground stations 806. In another example, a phased array antenna may be used to provide communication between the satellite 802 and the UTs 808.

Figure 10:
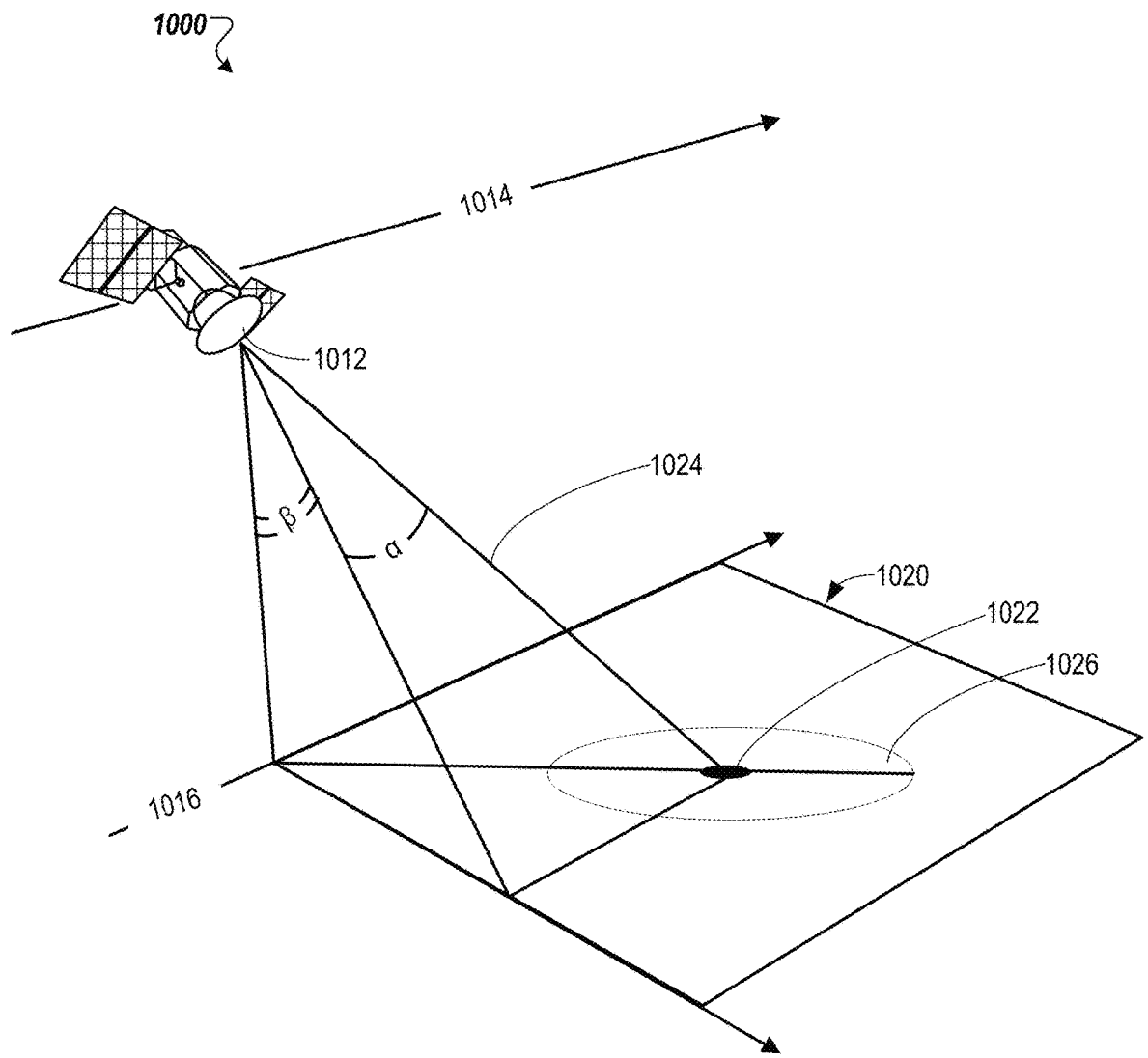
FIG. 10 illustrates a satellite including an antenna system that is steerable, according to embodiments of the present disclosure.

FIG. 10 illustrates the satellite 1000 including an antenna system 1012 that is steerable according to embodiments of the present disclosure. The satellite 1000 can include can include the communication system 100 or communication device 200 of FIGS. 1 and 2, as well as other array antennas and Tx DBF devices described herein. The antenna system 1012 may include multiple antenna elements that form an antenna and that can be mechanically or electrically steered individually, collectively, or a combination thereof. In an example, the antenna is a phased array antenna.

In orbit 804, the satellite 1000 follows a path 1014, the projection of which onto the surface of the Earth forms a ground path 1016. In the example illustrated in FIG. 10, the ground path 1016 and a projected axis extending orthogonally from the ground path 1016 at the position of the satellite 1000, together define a region 1020 of the surface of the Earth. In this example, the satellite 1000 is capable of establishing uplink and downlink communications with one or more of ground stations, user terminals, or other devices within the region 1020. In some embodiments, the region 1020 may be located in a different relative position to the ground path 1016 and the position of the satellite 1000. For example, the region 1020 may describe a region of the surface of the Earth directly below the satellite 1000. Furthermore, embodiments may include communications between the satellite 1000, an airborne communications system, and so forth.

As shown in FIG. 10, a communication target 1022 (e.g., a ground station, a user terminal, or a CT (such as an HD CT)) is located within the region 1020. The satellite 1000 controls the antenna system 1012 to steer transmission and reception of communications signals to selectively communicate with the communication target 1022. For example, in a downlink transmission from the satellite 1000 to the communication target 1022, a signal beam 1024 emitted by the antenna system 1012 is steerable within an area 1026 of the region 1020. In some implementations, the signal beam 1024 may include multiple subbeams. The extents of the area 1026 define an angular range within which the signal beam 1024 is steerable, where the direction of the signal beam 1024 is described by a beam angle "α" relative to a surface normal vector of the antenna system 1012. In two-dimensional phased array antennas, the signal beam 1024 is steerable in two dimensions, described in FIG. 15 by a second angle "β" orthogonal to the beam angle α. In this way, the area 1026 is a two-dimensional area within the region 1020, rather than a linear track at a fixed angle determined by the orientation of the antenna system 1012 relative to the ground path 1016.

In FIG. 10, as the satellite 1000 follows the path 1014, the area 1026 tracks along the surface of the Earth. In this way, the communication target 1022, which is shown centered in the area 1026 for clarity, is within the angular range of the antenna system 1012 for a period of time. During that time, signals communicated between the satellite 1000 and the communication target 1022 are subject to bandwidth constraints, including but not limited to signal strength and calibration of the signal beam 1024. In an example, for phased array antenna systems, the signal beam 1024 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 11:
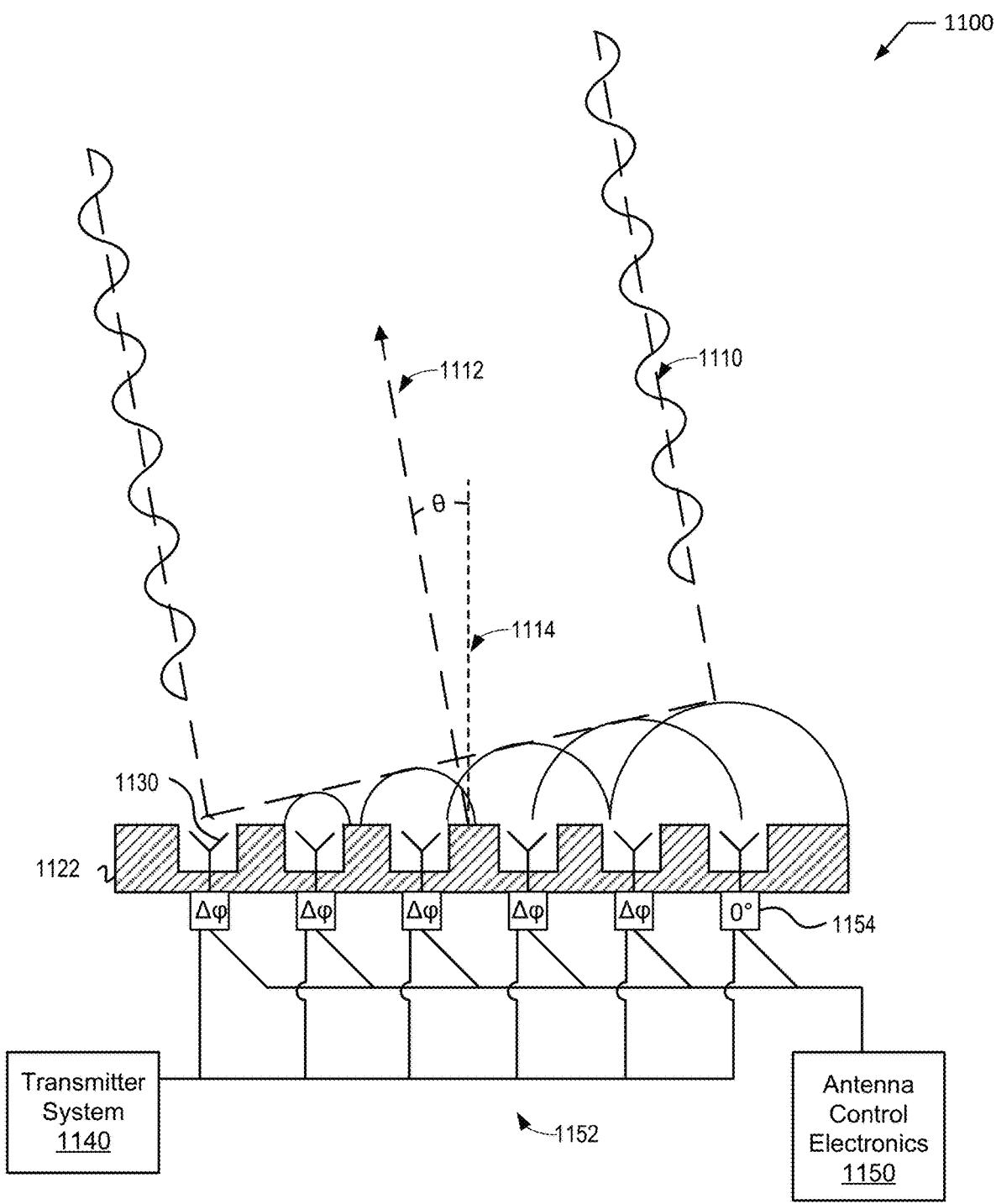
FIG. 11 illustrates a simplified schematic of an antenna, according to embodiments of the present disclosure.

FIG. 11 illustrates a simplified schematic of an antenna 1100, according to embodiments of the present disclosure. The antenna 1100 may be a component of the antenna system 1012 of FIG. 10. As illustrated, the antenna 1100 is a phased array antenna that includes multiple antenna elements 1130 (e.g. antenna elements 148 in FIG. 1). Interference between the antenna elements 1130 forms a directional radiation pattern in both transmitter and receiver arrays forming a beam 1110 (beam extents shown as dashed lines). The beam 1110 is a portion of a larger transmission pattern (not shown) that extends beyond the immediate vicinity of the antenna 1100. The beam 1110 is directed along a beam vector 1112, described by an angle "θ" relative to an axis 1114 normal to a surface of the antenna 1100. As described below, the beam 1110 is one or more of steerable or shapeable through control of operating parameters including, but not limited to a phase and an amplitude of each antenna element 1130.

In FIG. 11, the antenna 1100 includes, within a transmitter section 1122, the antenna elements 1130, which may include, but are not limited to, omnidirectional transmitter antennas coupled to a transmitter system 1140, such as the downlink transmitter 1478. The transmitter system 1140 provides a signal, such as a downlink signal to be transmitted to a ground station on the surface. The downlink signal is provided to each antenna element 1130 as a time-varying signal that may include several multiplexed signals. To steer the beam 1110 relative to the axis 1114, the phased array antenna system 1100 includes antenna control electronics 1150 controlling a radio frequency (RF) feeding network 1152, including multiple signal conditioning components 1154 interposed between the antenna elements 1130 and the transmitter system 1140. The signal conditioning components 1154 introduce one or more of a phase modulation or an amplitude modulation (e.g. by phase shifters 216 in FIG. 2), as denoted by "$\Delta\varphi$" in FIG. 11, to the signal sent to the antenna elements 1130. As shown in FIG. 11, introducing a progressive phase modulation produces interference in the individual transmission of each antenna element 1130 that generates the beam 1110.

The phase modulation imposed on each antenna element 1130 can differ and can be dependent on a spatial location of a communication target that determines an optimum beam vector (e.g., where the beam vector 1112 is found by one or more of maximizing signal intensity or connection strength). The optimum beam vector may change with time as the communication target 1022 moves relative to the phased array antenna system 1100.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system, comprising:
    a communication device comprising an array antenna;
    a digital beamforming (DBF) device coupled to a set of antenna elements of the array antenna, the DBF device comprising:
        a phase shifter coupled to a first antenna element; and
        a signal amplifier coupled to the first antenna element;
    a memory coupled to the DBF device, the memory comprising first data that causes a beam having a specified pattern to be generated by the set of antenna elements of the array antenna, a first phase offset value associated with the phase shifter, and a first amplitude offset value associated with the signal amplifier; and
    a controller coupled to the DBF device and the memory, wherein the controller:
        receives a first command from a processing device, the first command initiates a calibration procedure associated with the first antenna element;
        causes the DBF device to generate and send, using (i) the first phase offset value and (ii) the first amplitude offset value according to the specified pattern, a first periodic radio frequency (RF) signal to a measurement device via the first antenna element;
        causes the DBF device to generate and send a reference periodic RF signal to the measurement device via a reference antenna element;
        sends, over a wired connection between the controller and the measurement device, a first reference clock associated with the first periodic RF signal and the reference RF signal;
        receives a second command from the processing device, the second command indicating a modification of at least one of the first phase offset value or the first amplitude offset value to at least one of a second phase offset value or a second amplitude offset value for the specified pattern; and causes the DBF to generate and send, using the at least one of the second phase offset value or the second amplitude offset value, a second periodic RF signal to the measurement device via the first antenna element;

wherein the measurement device acquires and sends to the processing device, measurement data using the first reference clock, the measurement data indicating conditions of the first periodic RF signal and the reference periodic RF signal received at the measurement device; and wherein the processing device:

determines a first signal characteristic value of the first periodic RF signal and a second signal characteristic value of the reference periodic RF signal based on the measurement data; and determines the modification based on a comparison between the first signal characteristic value and the second signal characteristic value.

2. The communication system of claim 1, wherein:

the processing device sends second data to the measurement device, the second data indicating a first periodicity of the first periodic RF signal and the reference periodic RF signal and a data acquisition rate associated with the first periodicity; and the measurement device acquires the measurement data further using the first data.

3. The communication system of claim 1, wherein:

the first periodic RF signal comprises a multi-tone signal having a first frequency tone and a second frequency tone, wherein each of the first phase offset and the first amplitude offset are associated with the first frequency tone;

the first data further comprises at least one of a third phase offset value or a third amplitude offset value associated with the second frequency tone; and the controller receives a third command from the processing device, the third command modifying at least one of the third phase offset value or the third amplitude offset value to at least one of a fourth phase offset value or a fourth amplitude offset value for the specified pattern.

4. A method, comprising:

sending, by a processing device to a communication device, first instructions causing the communication device to send, a first radio frequency (RF) signal and a reference RF signal to a measurement device;

sending, by the processing device to the measurement device, first data indicating a first periodicity of the first RF signal and a first data acquisition parameter;

after sending the first data to the measurement device, receiving, by the processing device from the measurement device, second data indicating measurements of the first RF signal and the reference RF signal received at the measurement device;

determining, by the processing device and based on the second data, a first signal characteristic value of the first RF signal and a second signal characteristic value of the reference RF signal; and sending, by the processing device to the communication device, an offset value based on a comparison between the first signal characteristic value and the second signal characteristic value.

5. The method of claim 4, further comprising, causing, by the processing device, the communication device to send a third RF signal to the measurement device and wherein:

sending the first RF signal comprises sending the first RF signal using a first antenna element of an antenna array; and sending the reference RF signal comprises sending the reference RF signal using a second antenna element of the antenna array.

6. The method of claim 4, wherein the offset value is associated with at least one of a phase, amplitude, or time delay of the first RF signal.

7. The method of claim 4, wherein the second data comprises character encoded I/Q data, wherein the method further comprises decoding the character encoded I/Q data to generate at least one of the first signal characteristic value or the second signal characteristic value.

8. The method of claim 4, further comprising:

causing, by the processing device, the communication device to send third data indicating a first reference clock associated with at least one of the first RF signal or the reference RF signal.

9. The method of claim 4, wherein:

the first instructions further comprises a first signal propagation direction; and the first instructions further cause the communication device to send the first RF signal and the reference RF signal along the first signal propagation direction to the measurement device.

10. The method of claim 4, wherein:

the first RF signal comprises a multi-tone signal having a first frequency tone and a second frequency tone, wherein each of the offset value and the first signal characteristic value are associated with the first frequency tone; and the first RF signal is further generated using a second offset value associated with the second frequency tone.

11. The method of claim 10, further comprising:

determining, by the processing device, a third signal characteristic value of the first RF signal based on the second data, wherein the third signal characteristic value is associated with the second frequency tone; and sending, from the processing device to the communication device, a third offset value based on a comparison between the third signal characteristic value and the second signal characteristic value.

12. The method of claim 4, wherein the first data acquisition parameter comprises a sampling rate having an integer multiple of the first periodicity.

13. A method, comprising:

generating, by a communication device, a first radio frequency (RF) signal and a reference RF signal, the first RF signal generated using a first offset value;

sending, by the communication device to a measurement device (i) the first RF signal, (ii) the reference RF signal, and (iii) a reference clock associated with generating the first RF signal and the reference RF signal;

receiving, by a communication device from a processing device, first instructions to modify the first offset value to a second offset value; and generating, by the communication device, a second RF signal using the second offset value.

14. The method of claim 13, wherein:

sending, by a processing device to the measurement device, first data indicating a first periodicity of the first RF signal and the reference RF signal and a data acquisition parameter associated with the first periodicity; and receiving, by the processing device, second data indicating one or more measurements of the first RF signal and the reference RF signal received at the measurement device, wherein the second data is acquired according to the first data; and determining, by the processing device, first instructions based of a comparison of the one or more measurements of the first RF signal and the reference RF signal.

15. The method of claim 14, further comprising:

determining, by the processing device, a first signal characteristic value of the first RF signal and a second signal characteristic value of the reference RF signal based on the second data, wherein the first instructions are determined further based on a comparison of the first signal characteristic value and the second signal characteristic value.

16. The method of claim 14, wherein the data acquisition parameter comprises a sampling rate having an integer multiple of the first periodicity.

17. The method of claim 13, wherein the first offset value is associated with at least one of a phase, amplitude, or time delay of the first RF signal.

18. The method of claim 13, further comprising:

receiving, by the communication device from the processing device, second data indicating a signal propagation direction, wherein:

sending the first RF signal comprises sending the first RF signal along the signal propagation direction; and sending the reference RF signal comprises sending the reference RF signal along the signal propagation direction.

19. The method of claim 13, wherein the first RF signal comprises a multi-tone signal having a first frequency tone and a second frequency tone, wherein the first offset value is associated with the first frequency tone; and the first RF signal is generated further using a third offset value associated with the second frequency tone.

20. The method of claim 13, further comprising:

sending the first RF signal to the measurement device using a first antenna element of an antenna array; and sending the reference RF signal to the measurement device using a second antenna element of the antenna array.

* * * * *